United States Patent
Wu et al.

(10) Patent No.: US 12,438,254 B2
(45) Date of Patent: Oct. 7, 2025

(54) ELECTRONIC DEVICE

(71) Applicant: Huawei Technologies Co., Ltd., Shenzhen (CN)

(72) Inventors: Pengfei Wu, Shanghai (CN); Hanyang Wang, Reading (GB); Meng Hou, Shanghai (CN); Chien-Ming Lee, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 82 days.

(21) Appl. No.: 18/259,190

(22) PCT Filed: Dec. 8, 2021

(86) PCT No.: PCT/CN2021/136349
§ 371 (c)(1),
(2) Date: Jun. 23, 2023

(87) PCT Pub. No.: WO2022/135148
PCT Pub. Date: Jun. 30, 2022

(65) Prior Publication Data
US 2024/0304982 A1 Sep. 12, 2024

(30) Foreign Application Priority Data
Dec. 25, 2020 (CN) .......................... 202011564230.2

(51) Int. Cl.
*H01Q 1/24* (2006.01)
*H01Q 1/38* (2006.01)
(Continued)

(52) U.S. Cl.
CPC ............... *H01Q 1/243* (2013.01); *H01Q 1/38* (2013.01); *H01Q 1/48* (2013.01); *H01Q 1/50* (2013.01);
(Continued)

(58) Field of Classification Search
CPC .......... H01Q 1/24; H01Q 1/242; H01Q 1/243; H01Q 1/36; H01Q 1/38; H01Q 1/48;
(Continued)

(56) References Cited

U.S. PATENT DOCUMENTS 10,498,041 B1 * 12/2019 Lin ........................ H01Q 13/16
10,542,130 B1 * 1/2020 Lo .......................... H04M 1/026
(Continued)

FOREIGN PATENT DOCUMENTS

| CN | 101483270 A | 7/2009 |
|---|---|---|
| CN | 102738558 A | 10/2012 |

(Continued)

*Primary Examiner* — Hoang V Nguyen
(74) *Attorney, Agent, or Firm* — Conley Rose, P.C.

(57) ABSTRACT

An electronic device includes a conductive frame and a first antenna unit. The conductive frame is disposed around a periphery of the electronic device. The first antenna unit includes a first conductive layer and a second conductive layer spaced apart in a thickness direction of the electronic device; a conductive connection portion is configured to connect the first conductive layer and the second conductive layer; and a first conductive frame, is a part of the conductive frame. The conductive connection portion, the first conductive frame, the first conductive layer, and the second conductive layer enclose a first cavity, and the first conductive layer and the first conductive frame are spaced apart to form a first slot of the first cavity.

20 Claims, 22 Drawing Sheets

(51) Int. Cl.
*H01Q 1/48* (2006.01)
*H01Q 1/50* (2006.01)
*H01Q 1/52* (2006.01)
*H01Q 13/18* (2006.01)
*H01Q 21/28* (2006.01)
*H01Q 5/378* (2015.01)

(52) U.S. Cl.
CPC ............. *H01Q 1/523* (2013.01); *H01Q 13/18* (2013.01); *H01Q 21/28* (2013.01); *H01Q 5/378* (2015.01)

(58) Field of Classification Search
CPC .......... H01Q 1/50; H01Q 1/521; H01Q 1/523; H01Q 5/371; H01Q 5/378; H01Q 9/0421; H01Q 13/18; H01Q 21/28
See application file for complete search history.

(56) References Cited

U.S. PATENT DOCUMENTS

| | | |
|---|---|---|
| 2011/0133995 A1 | 6/2011 | Pascolini et al. |
| 2014/0300518 A1 | 10/2014 | Ramachandran et al. |
| 2015/0340756 A1* | 11/2015 | Huang ................... H01Q 13/10 343/702 |
| 2016/0104944 A1 | 4/2016 | Rajagopalan et al. |
| 2016/0365623 A1* | 12/2016 | Kim ......................... H01Q 9/42 |
| 2018/0294576 A1 | 10/2018 | Niakan et al. |
| 2020/0212584 A1 | 7/2020 | Park et al. |
| 2020/0259258 A1 | 8/2020 | Amiri et al. |
| 2020/0314223 A1* | 10/2020 | Khripkov ............... H01Q 1/243 |

FOREIGN PATENT DOCUMENTS

| | | |
|---|---|---|
| CN | 103022688 B | 1/2016 |
| CN | 105244626 A | 1/2016 |
| CN | 205016663 U | 2/2016 |
| CN | 208589533 U | 3/2019 |
| CN | 208690478 U | 4/2019 |
| WO | 2020138918 A1 | 7/2020 |

* cited by examiner (a) 3.87 GHz (b) 7 GHz (c) 3.87 GHz (d) 7 GHz (a) 3.87 GHz          (b) 7 GHz (a) 3.87 GHz  (b) 4.89 GHz (c) 3.87 GHz  (d) 4.89 GHz (a) 3.87 Ghz    (b) 4.89 GHz

ELECTRONIC DEVICE

CROSS-REFERENCE TO RELATED APPLICATIONS

This is a National Stage of International Patent Application No. PCT/CN2021/136349 filed on Dec. 8, 2021, which claims priority to Chinese Patent Application No. 202011564230.2 filed on Dec. 25, 2020, both of which are hereby incorporated by reference in their entireties.

TECHNICAL FIELD

Embodiments of this application relate to the field of antenna technologies, and in particular, to an electronic device.

BACKGROUND

With development of communication technologies, a multiple-input multiple-output (multiple-input multiple-output, MIMO) antenna technology is more widely used in electronic devices, a quantity of antennas increases exponentially, and more frequency bands are covered. Electronic device products, especially metal industrial design (industrial design, ID) electronic device, still require high structural compactness. Recent trends in electronic device design are higher screen-to-body ratios, more multimedia devices, and larger battery capacity. These designs dramatically compress antenna space.

A slot antenna is an antenna formed by slits on a conductor surface. Electromagnetic waves radiate to external space through a slot. Slot antennas have characteristics of low profile and integration, which have attracted wide attention and research.

The slot antenna may be used for a terminal device, to implement miniaturization of the terminal device.

SUMMARY

Embodiments of this application provide an electronic device, to resolve a problem that an antenna unit occupies excessively large space.

To achieve the foregoing objectives, the following technical solutions are used in this application.

This application provides an electronic device, including a conductive frame and a first antenna unit. The conductive frame is disposed around a periphery of the electronic device. The first antenna unit includes: a first conductive layer and a second conductive layer, where the first conductive layer and the second conductive layer are spaced apart in a thickness direction of the electronic device; a conductive connection portion, where the conductive connection portion is configured to connect the first conductive layer and the second conductive layer; and a first conductive frame, where the first conductive frame is a part of the conductive frame, a first slot exists between the first conductive layer and the first conductive frame, and the conductive connection portion, the first conductive frame, the first conductive layer, and the second conductive layer enclose a first cavity. Therefore, the conductive connection portion, the first conductive frame, the first conductive layer, and the second conductive layer enclose a first cavity, and the first conductive layer and the first conductive frame are spaced apart to form a first slot of the first cavity. In this way, the first antenna unit may radiate or receive an electromagnetic wave through the first slot, so that no slot is required on a surface of a metal plate, thereby improving integrality of the metal plate.

In an optional implementation, the electronic device further includes a first feeding unit. The first feeding unit feeds the first antenna unit through the first conductive layer. The first feeding unit is electrically connected or coupled to the first conductive layer. Therefore, a feeding manner is more flexible.

In an optional implementation, the electronic device further includes a ground. The second conductive layer is electrically connected or coupled to the ground. The first antenna unit is grounded through the second conductive layer. Therefore, the first antenna unit has a simple structure and is easy to be assembled.

In an optional implementation, the electronic device further includes a ground, and the ground forms the second conductive layer. In this way, the ground of the electronic device may be reused for the first antenna unit, and another metal component does not need to be disposed additionally, thereby reducing manufacturing costs of the antenna and saving more space. The electronic device further includes a center frame. The ground is disposed on the center frame, and is disposed on a side that is of the center frame and that faces the first conductive layer. The conductive frame may be a part of the center frame.

In an optional implementation, the electronic device further includes a metal rear cover, and the metal rear cover forms the first conductive layer. Therefore, the metal rear cover may be reused to the first antenna unit, and is used as a part of the first antenna unit. Another metal component does not need to be disposed additionally. This can reduce manufacturing costs of the antenna and save more space.

In an optional implementation, the electronic device further includes a display assembly, and the first conductive layer is disposed on a side that is of the display assembly and that faces the ground. Therefore, the side that is of the display assembly and that faces the ground may be provided with a metal layer as the first conductive layer of the first antenna unit. The structure is simple, manufacturing costs of the antenna may be reduced, and more space may be saved. In addition, at least a part of a surface that is of the display assembly and that faces the ground may be coated with metal as the first conductive layer, for example, a lining board of the display assembly may be coated with metal.

In an optional implementation, the conductive connection portion is structured by a conductive wall, and two sides of the conductive wall are respectively connected to the first conductive layer and the second conductive layer. Therefore, connection of the conductive wall structure is more stable, and sealing performance is high, to avoid energy leakage.

In an optional implementation, the conductive connection portion includes a plurality of dot-joint structures, and a distance between adjacent dot-joint structures is less than or equal to a half of a wavelength corresponding to a center frequency of an operating frequency band of the first antenna. Therefore, the dot-joint structures save more internal space of the electronic device.

In an optional implementation, the dot-joint structures are metal domes, and two ends of the metal domes are respectively connected to the first conductive layer and the second conductive layer.

In an optional implementation, a projection of the conductive connection portion on the second conductive layer is within a range of a projection of the first conductive layer on the second conductive layer.

In an optional implementation, a projection of the conductive connection portion on a bearing plate is one or a combination of a curve, a fold line, or a straight line. In this way, the conductive connection portion has a more flexible shape and is easy to install.

In an optional implementation, the first slot is filled with an insulating material. The insulating material is polycarbonate and acrylonitrile-butadiene-styrene copolymer and mixture PC/ABS material. In this way, appearance integrality of the electronic device is further improved.

In an optional implementation, the first antenna unit radiates or receives an electromagnetic wave through the first slot.

In an optional implementation, the electronic device further includes: the electronic device further includes: a second antenna unit and a second feeding unit, where the second feeding unit feeds the second antenna unit, and the second antenna unit includes: a first ground point, where the first ground point is disposed on the conductive frame; and a first radiator, where a second slot is disposed on the conductive frame, a conductive frame between the first ground point and the second slot forms the first radiator, and the first ground point is configured to ground the second antenna unit. Therefore, a plurality of antennas may be disposed on the electronic device, and the first antenna unit and the second antenna unit may work simultaneously, to enhance signal processing reliability, signal transmission range, and throughput, and improve communication quality.

In an optional implementation, at least a part of the first radiator is formed by the first conductive frame. In this way, the second antenna unit may be reused for the first antenna unit, and a bandwidth of the first antenna unit may be broadened.

In an optional implementation, the electronic device further includes a first filter, and the second feeding unit is electrically connected or coupled to the first radiator through the first filter. Therefore, the first filter may filter out a signal of the first antenna unit, to improve isolation between the first antenna unit and the second antenna unit.

In an optional implementation, the second antenna unit further includes: a second radiator, where a second slot is disposed on the conductive frame, and a conductive frame between the second slot and the first slot forms the second radiator; and a second ground point, where the second ground point is disposed on the second radiator and is configured to ground the second antenna unit. In this way, the second radiator is disposed, so that communication quality may be further improved.

In an optional implementation, the second feeding unit is electrically connected to the second radiator. Therefore, distributed feeding is used for the first radiator and the second radiator, and a structure is simpler.

In an optional implementation, the second radiator is coupled to the first radiator through a first slot. Therefore, the second radiator may be used as a parasitic radiator of the first radiator, so that manufacturing costs of the antenna may be reduced.

In an optional implementation, the electronic device further includes: a second filter, where the second feeding unit is electrically connected or coupled to the second radiator through the second filter. Therefore, the second filter may filter the signal of the first antenna unit, to avoid a same frequency between the first antenna unit and the second antenna unit, and improve isolation between the first antenna unit and the second antenna unit.

DESCRIPTION OF EMBODIMENTS

Figure 1:
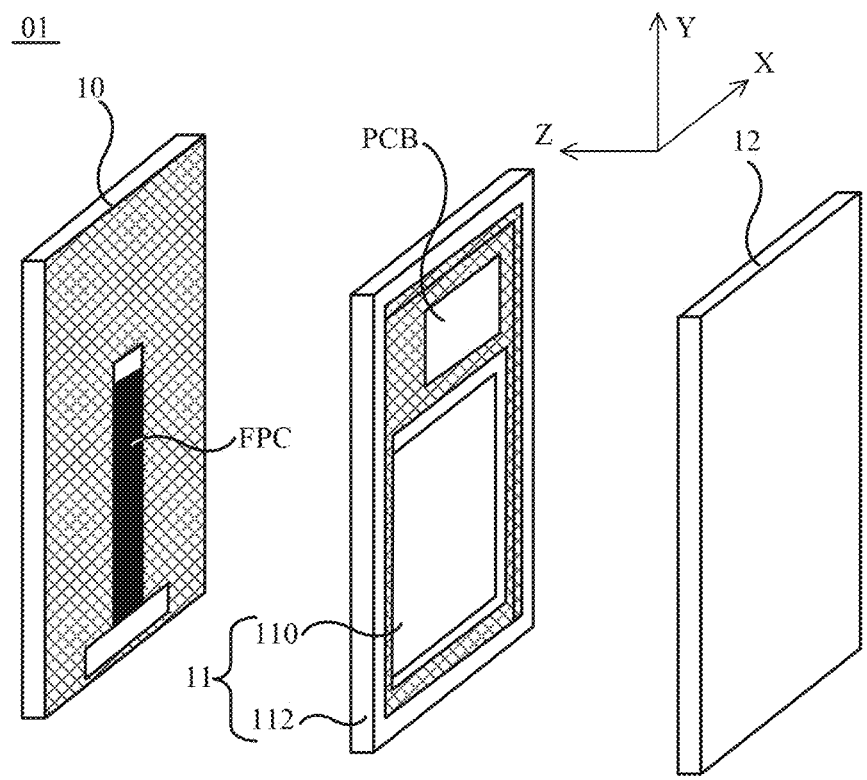
FIG. 1 is a schematic diagram of an exploded structure of an electronic device according to an embodiment of this application.

To make the objectives, technical solutions, and advantages of this application clearer, the following further describes this application in detail with reference to the accompanying drawings.

In the following, the terms such as "first" and "second" are used merely for a purpose of description, and cannot be construed as indicating or implying relative importance or implying a quantity of indicated technical features. Therefore, a feature limited by "first" or "second" may explicitly or implicitly include one or more features. In description of this application, unless otherwise stated, "a plurality of" means two or more.

In addition, in this application, orientation terms such as "up" and "down" are defined relative to an orientation in which a component is schematically placed in the accompanying drawings. It should be understood that these directional terms are relative concepts, and are used to describe and clarify relativeness, which may vary accordingly based on an orientation in which a component is placed in the accompanying drawings.

Possible terms in embodiments of this application are described below.

Electrical connection: It may be understood as a form in which components are physically contacted and electrically conducted, or may be understood as a form in which different components in a line structure are connected through a physical line that can transmit an electrical signal, like a PCB copper foil or a conducting wire. "Connection" refers to a connection of a mechanical structure and a physical structure.

Coupling: It refers to a phenomenon that input and output of two or more circuit elements or electrical networks closely cooperate and interact with each other, and transmit energy from one side to the other through interaction.

Connection: In the foregoing "electrical connection" or "coupling" manner, two or more components are conducted or interconnected to perform signal/energy transmission. This may be referred to as connection.

Antenna pattern: also known as radiation pattern. A pattern in which a relative field strength (normalized modulus value) of the antenna radiation field varies with a direction at a particular distance from the antenna. Usually, the pattern is represented by two mutually perpendicular plane patterns in a direction of maximum radiation of the antenna.

An antenna pattern usually has a plurality of radiation beams. The radiation beam with the largest radiation intensity is called a main lobe, and the remaining radiation beams are called side lobes or sidelobes. In the side lobes, a side lobe in an opposite direction to the main lobe is also called a back lobe.

Antenna return loss: It may be understood as a ratio of signal power reflected by an antenna circuit back to an antenna port to transmit power of the antenna port. A smaller reflected signal indicates a larger signal radiated from the antenna to space and a higher radiation efficiency of the antenna. A larger reflected signal indicates a smaller signal radiated from the antenna to space and a lower radiation efficiency of the antenna.

The antenna return loss may be represented by an S11 parameter, and the S11 parameter is usually a negative number. A smaller value of the S11 parameter indicates a smaller antenna return loss and a higher radiation efficiency of the antenna. A larger value of the S11 parameter indicates a larger antenna return loss and a lower radiation efficiency of the antenna.

Antenna isolation: It refers to a ratio of power of a signal transmitted by one antenna to power of a signal received by another antenna.

Antenna system efficiency: It refers to a ratio of power that the antenna radiates to space (that is, power that effectively converts an electromagnetic wave part) to input power of the antenna.

Antenna radiation efficiency: It refers to a ratio of power radiated by the antenna to space (that is, power that effectively converts an electromagnetic wave part) to active power input to the antenna. Active power input to the antenna equals to input power of the antenna minus antenna loss. The antenna loss mainly includes an ohmic loss and/or a dielectric loss of a metal.

An embodiment of this application provides an electronic device. The electronic device includes, for example, a mobile phone, a tablet computer, a vehicle-mounted computer, a smart wearable product, an Internet of Things (Internet of Things, IoT). A specific form of the foregoing electronic device is not specially limited in this embodiment of this application. For ease of description, the following uses an example in which the electronic device is a mobile phone for description. As shown in FIG. 1, an electronic device 01 mainly includes a display assembly 10, a center frame 11, and a metal rear cover 12. The center frame 11 is located between the display assembly 10 and the metal rear cover 12.

The display assembly 10 is configured to display an image. In some embodiments of this application, the display assembly 10 includes a liquid crystal display (liquid crystal display, LCD) module and a back light unit (back light unit, BLU). Alternatively, in some other embodiments of this application, the display assembly 10 may be an organic light emitting diode (organic light emitting diode, OLED) display.

The center frame 11 includes a bearing plate 110 and a conductive frame 112 that wraps around the bearing plate 110. In some embodiments, the conductive frame 112 may be a conductive frame integrally formed on the bearing plate 110. It should be understood that, in some other embodiments, the conductive frame 112 and the center frame 11 may alternatively be independent. For example, different materials may be used to form the conductive frame 112 and the center frame 11 respectively. For example, the center frame 11 is formed by a conductive material, and the conductive frame 112 is formed by a non-conductive material.

Electronic devices such as a printed circuit board (printed circuit board, PCB), a camera, and a battery may be disposed on a surface that is of the bearing plate 110 and that faces the metal rear cover 12. The camera and the battery are not shown in the figure. The metal rear cover 12 is connected to the center frame 11 to form an accommodating cavity for accommodating the foregoing electronic components such as the PCB, the camera, and the battery. Therefore, external water vapor and dust can be prevented from intruding into the accommodation cavity and affecting performance of the electronic device.

The display assembly 10 may pass through the bearing plate 110 via a flexible printed circuit (flexible printed circuit, FPC) as shown in FIG. 1, and then is electrically connected to a PCB disposed on the bearing plate 110. In this way, the PCB may transmit display data to the display assembly 10, to control the display assembly 10 to display an image.

The display assembly 10, the center frame 11, and the metal rear cover 12 may be respectively disposed at different layers in a thickness direction of the electronic device. These layers may be parallel to each other. A plane in which the layers are located may be referred to as an X-Y plane, and a direction perpendicular to the X-Y plane may be referred to as a Z direction. That is, the display assembly 10, the center frame 11, and the metal rear cover 12 may be layered in the Z direction.

Figure 2:
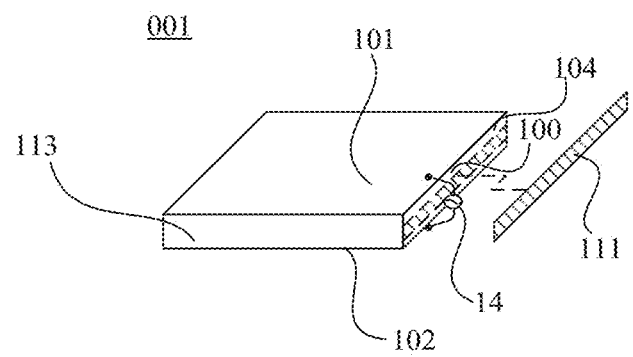
FIG. 2 is a schematic diagram of a structure of a first antenna unit according to an embodiment of this application.

The foregoing electronic device further includes a first feeding system 14 as shown in FIG. 2 and a first antenna unit 001 configured for communication. The first feeding system 14 feeds the first antenna unit 001, and the first antenna unit 001 is configured to transmit an electromagnetic wave and receive an electromagnetic wave.

As shown in FIG. 2, the first antenna unit 001 includes a first conductive layer 101 and a second conductive layer 102 spaced apart in a thickness direction of the electronic device.

The first conductive layer 101 and the second conductive layer 102 are disposed in parallel, for example, in the thickness direction of the electronic device.

In some embodiments, the first conductive layer 101 may be formed by a conductive rear cover (for example, a metal rear cover) of the electronic device shown in FIG. 1 or a conductive layer on the display assembly, and the second conductive layer 102 may be formed by a ground of the electronic device. For example, a side that is of the display assembly and that faces the ground is provided with the first conductive layer, or at least a part of a surface that is of the display assembly and that faces the ground is coated with metal as the first conductive layer. (For example, a lining board of the display assembly is coated with metal).

The conductive layer of the display assembly may be a metal layer formed on a side that is of the display assembly 10 and that faces the bearing plate.

The first antenna unit 001 further includes a conductive connection portion 113 for connecting the first conductive layer 101 and the second conductive layer 102.

The conductive connection portion 113 is formed of a metal wall or a metal dome or a metal via.

In some embodiments, the first antenna unit 001 further includes a first conductive frame 111. The first conductive frame 111 may be formed by at least a part of the conductive frame 112 of the electronic device shown in FIG. 1. The conductive frame 112 may be, for example, a conductive frame disposed around a periphery of the electronic device. In some embodiments, the first conductive frame 111 may be, for example, a straight strip-shaped frame on a side frame, or an L-shaped frame at a junction between a top frame and a side frame.

The first antenna unit 001 may be disposed in the electronic device 01 shown in FIG. 1. The first conductive layer 101, the second conductive layer 102, and the conductive connection portion 113 of the first antenna unit 001 are all located in a region enclosed by a conductive frame. For example, the first conductive layer 101, the second conductive layer 102 and the conductive connection portion 113 are disposed relative to the first conductive frame 111.

It is necessary be noted that, the conductive frame (for example, the first conductive frame 111) may be a conductive frame formed of a conductive material like metal, or may alternatively be a conductive frame formed of a non-conductive material like plastic or resin, and a conductive radiator disposed on an inner side of the non-conductive material, or formed by a conductive radiator embedded in a non-conductive material.

In addition, an antenna in the electronic device 01 may transmit or receive signals through a frame formed of a conductive material, or may transmit or receive signals through a conductive radiator disposed on an inner side of a frame formed of a non-conductive material or a conductive radiator embedded in a frame formed of a non-conductive material.

The first conductive layer 101, the second conductive layer 102, and the conductive connection portion 113 are located in a region enclosed by the conductive frame 112. The first conductive layer 101, the second conductive layer 102, the conductive connection portion 113, and a first part (that is, the first conductive frame 111) of the conductive frame 112 enclose a first cavity 100. The first conductive layer 101 and the first conductive frame 111 are spaced apart, to form a first slot 104 of the first cavity 100.

It is necessary be noted that, the first conductive layer 101 and the second conductive layer 102 may be metal layers disposed at any interval inside the electronic device, and the first conductive layer 101 is not limited to the foregoing conductive rear cover (for example, a metal rear cover) or the display assembly (for example, a metal layer of the display assembly). The second conductive layer 102 is also not limited to a ground of an electronic device.

The first slot 104 may be a slot formed between the first conductive layer 101 and the first conductive frame 111, or may be formed by providing a slot on the first conductive layer 101 or the first conductive frame 111, to form a first cavity having the slot 104. These all fall within the protection scope of this application.

A structure of the first cavity is not limited in this embodiment of this application. At least one opposite part of the first conductive layer 101 and the second conductive layer 102 that enclose the first cavity is connected through the conductive connection portion 113.

In some embodiments of this application, the first cavity may be a hollow structure.

In some other embodiments of this application, the first cavity is further filled with a medium, and the medium is an insulating material, for example, a resin or a polychlorinated biphenyl (Polychlorinated biphenyl, PCB).

For example, the first antenna unit 001 further includes a radiator, a feeding point or a feeding branch, a ground point or a ground branch, or the like, or may further include a matching circuit. The feeding point or the feeding branch or the matching circuit is connected to the first feeding system 14, to feed the radiator.

The foregoing first antenna unit 001 is disposed in the electronic device 01, and may be combined with the electronic device 01.

Figure 3:
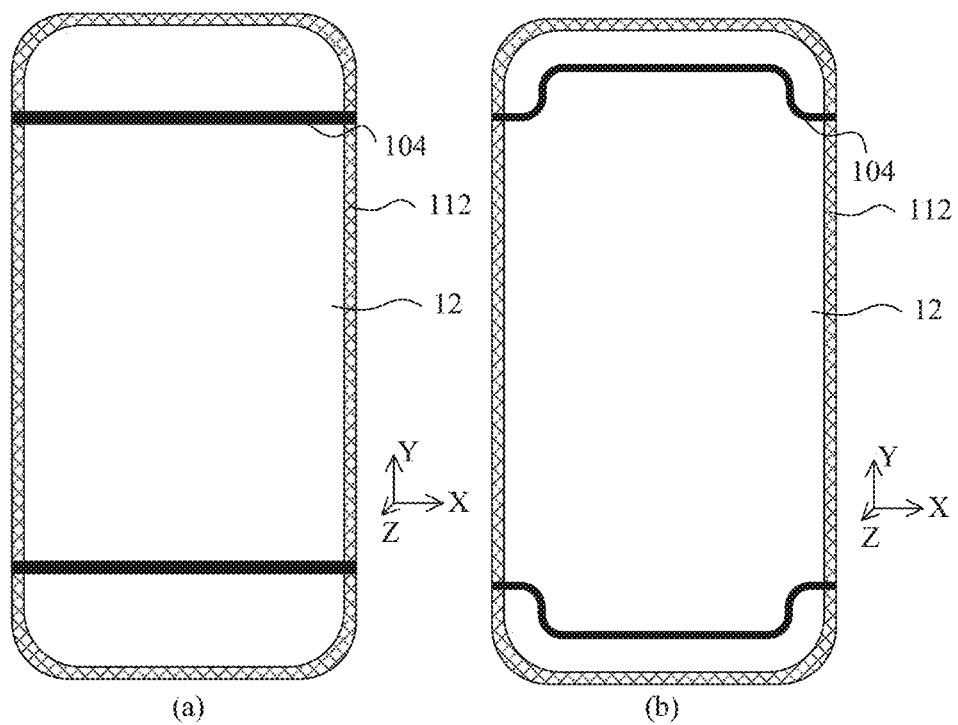
FIG. 3 is a rear view of an electronic device.

In some embodiments, as shown in (a) and (b) in FIG. 3, the metal rear cover 12 may be used as the first conductive layer 101 of the first antenna unit 001. For example, a first slot 104 is provided on surfaces of the metal rear cover 12 and the first conductive frame 111. This structure can obtain better antenna space and excite abundant antenna patterns.

However, in this slot manner, the conductive frame and the metal rear cover 12 of the electronic device 01 are divided, and integrality of the metal rear cover 12 and the conductive frame is affected.

Figure 4:
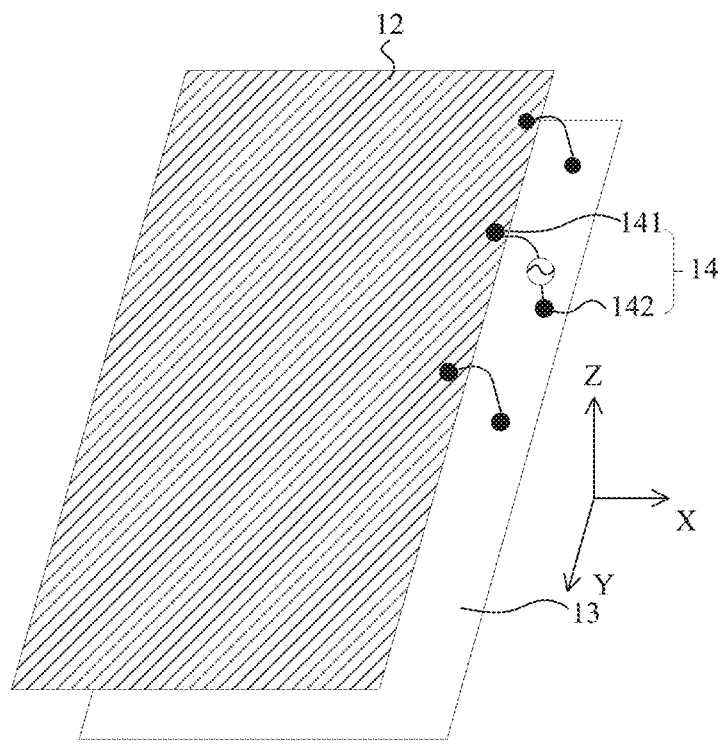
FIG. 4 is a schematic diagram of a structure of a conductive layer of an electronic device according to an embodiment of this application.
Figure 4A:
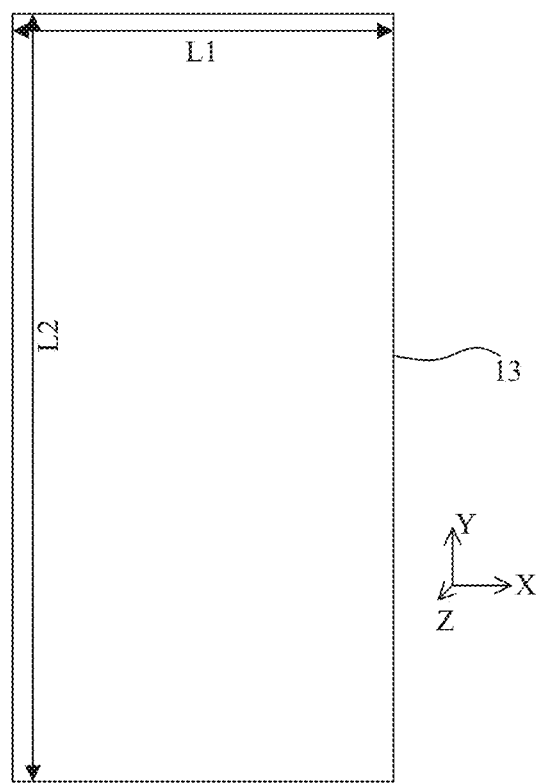
FIG. 4a is a bottom view of a first antenna unit in FIG. 4.
Figure 4B:
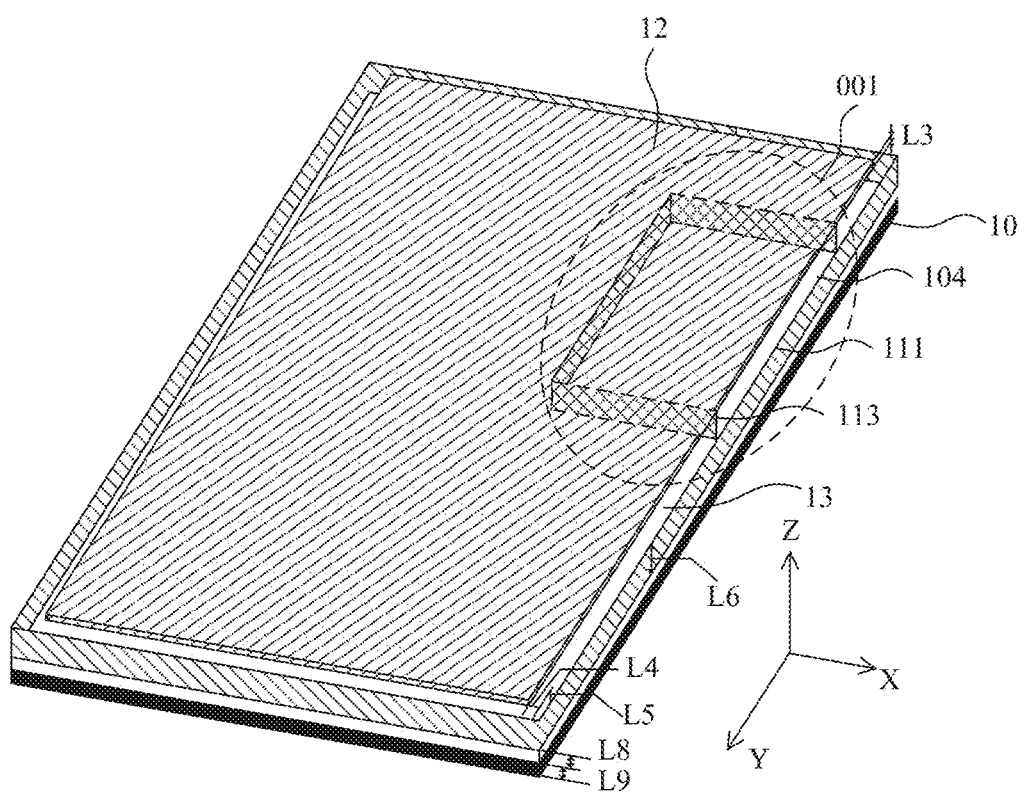
FIG. 4b is a schematic diagram of a structure of an electronic device according to an embodiment of this application.

In some other embodiments of this application, as shown in FIG. 4 and FIG. 4b, FIG. 4 shows a structure of a conductive layer inside an electronic device, and FIG. 4b shows a schematic diagram of combining a first antenna unit 001 with an electronic device. The metal rear cover 12 of the electronic device shown in FIG. 4b is made of a metal material. At least a part of the metal rear cover 12 may be used as the first conductive layer 101 shown in FIG. 4, or the first conductive layer 101 includes at least a part of the metal rear cover 12. It should be understood that the first conductive layer 101 may further include another metal layer.

Therefore, the metal rear cover may be reused for the first antenna unit 001. Another metal component does not need to be disposed additionally, so that manufacturing costs of the antenna may be reduced and more space is saved.

Figure 4C:
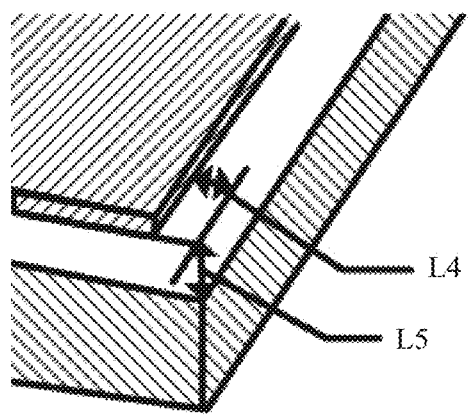
FIG. 4c is a partially enlarged view of the electronic device in FIG. 4b.
Figure 4D:
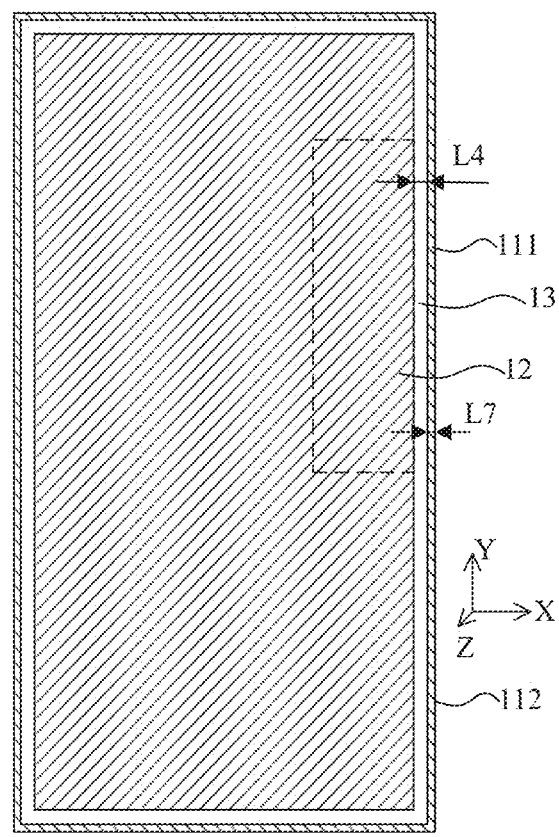
FIG. 4d is a top view of the electronic device in FIG. 4b.
Figure 4E:
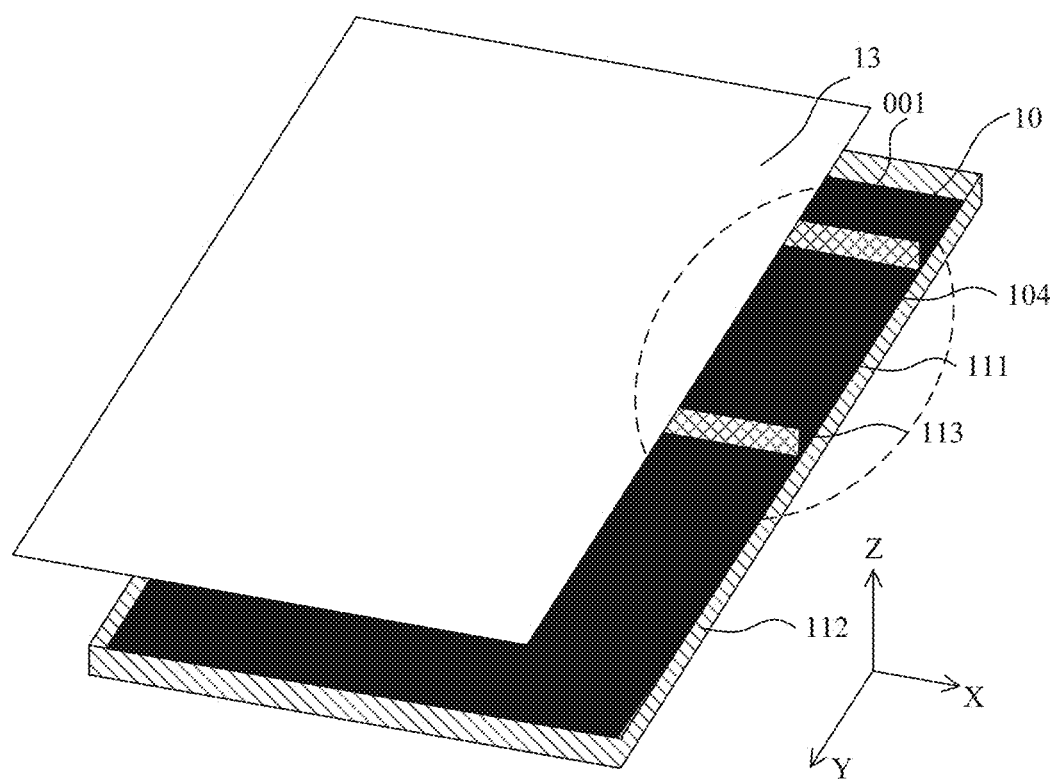
FIG. 4e is a schematic diagram of a structure of another electronic device according to an embodiment of this application.

In some other embodiments of this application, as shown in FIG. 4e, a side that is of the display assembly 10 and that faces a bearing plate is provided with a metal layer, and at least a part of the metal layer on the display assembly 10 shown in FIG. 4e may be used as the first conductive layer 101 shown in FIG. 4. In other words, the first conductive layer 101 includes at least a part of the metal layer on the display assembly 10. It should be understood that the first conductive layer 101 may further include another metal layer.

Therefore, the conductive layer of the display assembly may be reused for the first antenna unit 001, and another metal component does not need to be disposed additionally, so that manufacturing costs of the antenna may be reduced and more space is saved.

The electronic device 01 further includes a ground 13. In some embodiments, the second conductive layer 102 is electrically connected or coupled to the ground 13, and the first antenna unit 001 is grounded through the second conductive layer 102.

In other embodiments, the ground 13 forms the second conductive layer 102. At least a part of the ground 13 may be used as the second conductive layer 102 of the first antenna unit 001. In some embodiments of this application, the ground 13 may be a metal structure disposed on the bearing plate 110 of the electronic device 01 shown in FIG. 1. In some other embodiments of this application, the ground 13 may be a PCB disposed on the bearing plate 110 shown in FIG. 1, like a PCB ground. The PCB ground may be specifically a copper clad layer on the PCB.

The copper clad layer on the PCB forms the second conductive layer 102, or the second conductive layer 102 includes a part of the copper clad layer of the PCB. It should be understood that the second conductive layer 102 may further include another metal layer or ground layer.

In a three-dimensional schematic diagram shown in FIG. 4b, the ground 13 is located directly below the metal rear cover 12, and in a thickness direction of the electronic device, the ground 13 and the metal rear cover 12 are spaced apart. For example, the ground 13 is disposed in parallel to the metal rear cover 12 on an X-Y plane.

In a three-dimensional schematic diagram shown in FIG. 4e, the ground 13 is located directly above the display assembly 10, and in a thickness direction of the electronic device, the ground 13 and the display assembly 10 are spaced apart. For example, the ground 13 is disposed in parallel to the display assembly 10 on an X-Y plane.

Therefore, the ground 13 may be reused for the first antenna unit 001, and another metal component does not need to be disposed additionally, so that manufacturing costs of the antenna may be reduced and more space is saved.

As shown in FIG. 4, the first feeding system 14 includes a first feeding unit 141 and a first grounding unit 142. In some embodiments of this application, the first feeding unit 141 is electrically connected to the first conductive layer 101, the first grounding unit 142 is electrically connected to the ground 13, and feeds the first conductive layer 101 through the first feeding unit 141.

In some other embodiments of this application, the first feeding unit 141 is coupled to the first conductive layer 101, and the first feeding unit 141 feeds the first conductive layer 101 in a coupling manner.

As shown in FIG. 4b and FIG. 4e, the electronic device 01 further includes a conductive frame 112 (including, for example, a first conductive frame 111).

As shown in FIG. 1, the conductive frame 112 is disposed around the bearing plate 110, and a projection of the conductive frame 112 on the bearing plate 110 is located on an edge of the bearing plate 110.

The conductive connection portion 113 is located in a region enclosed by the conductive frame 112. For example, the conductive connection portion 113 is disposed relative to the first conductive frame 111. For another example, the conductive connection portion 113 is located inside the first conductive frame 111. As shown in FIG. 4b, the conductive connection portion 113 is configured to connect the metal rear cover 12 and the ground 13, and the conductive connection portion 113, the first conductive frame 111, the metal rear cover 12, and the ground 13 enclose the first cavity. The metal rear cover 12 and the first conductive frame 111 are spaced apart and enclose a first slot 104 of the first cavity. Alternatively, as shown in FIG. 4e, the conductive connection portion 113 is configured to connect the display assembly 10. (e.g., a conductive layer disposed on the display assembly 10) and the ground 13, and the conductive connection portion 113, the first conductive frame 111, the display assembly 10, and the ground 13 enclose the first cavity. The display assembly 10 and the first conductive frame 111 are spaced apart and enclose a first slot 104.

Therefore, a part of the conductive frame 112 may be reused for the first antenna unit 001, and another metal component does not need to be disposed additionally, so that manufacturing costs of the antenna may be reduced and more space is saved.

In an embodiment shown in FIG. 4b, a projection of the conductive connection portion 113 on the X-Y plane is, for example, within a projection range of the metal rear cover 12 on the X-Y plane. In some embodiments, a projection of the conductive connection portion 113 on the ground 13 is within a projection range of the metal rear cover 12 on the ground 13. In some specific embodiments, the conductive connection portion 113 is flush with an edge of the metal rear cover 12.

In an embodiment shown in FIG. 4e, a projection of the conductive connection portion 113 on the X-Y plane is, for example, within a projection range of the display assembly 10 on the X-Y plane. In some embodiments, a projection of the conductive connection portion 113 on the ground 13 is within a projection range of the display assembly 10 on the ground 13. In some specific embodiments, the conductive connection portion 113 is flush with an edge of the display assembly 10.

Figure 4F:
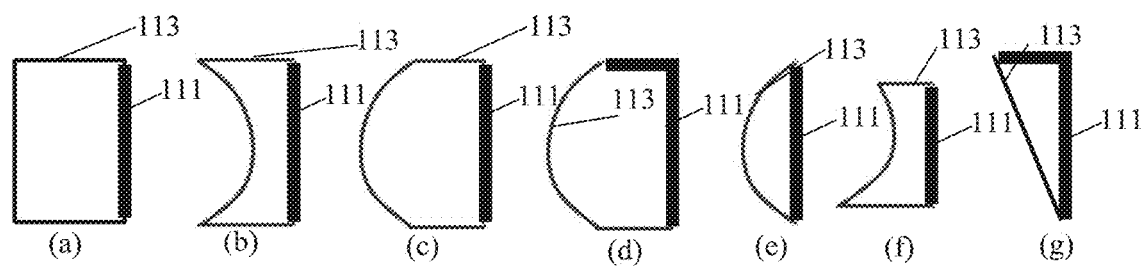
FIG. 4f is a projection diagram of a conductive connection portion according to an embodiment of this application.

The conductive connection portion 113 is located in a region enclosed by the conductive frame 112, and an opening exists on at least one side surface of the conductive connection portion 113. Apart of the conductive frame 112, for example, the first conductive frame 111, is located at the opening of the conductive connection portion 113. For example, a thin solid line shown in FIG. 4f is a projection of the conductive connection portion 113 on the X-Y plane, an opening of the conductive connection portion 113 is at a thick solid line, and the thick solid line is a projection of the first conductive frame 111 located in the opening on the X-Y plane.

It is necessary be noted that, in some embodiments, when the conductive connection portion 113 is flush with the edge of the metal rear cover 12 or the display assembly 10, and no slot exists between projections of the metal rear cover 12 or the display assembly 10 and the first conductive frame 111 on the X-Y plane, the first conductive frame 111 intersects the projection of the conductive connection portion 113 on the X-Y plane. In this case, the thin solid line intersects the thick solid line.

In some other embodiments, when a slot exists between the projection of the metal rear cover 12 or the display assembly 10 and the first conductive frame 111 on the X-Y plane, or when the conductive connection portion 113 is not flush with an edge of the metal rear cover 12 or the display assembly 10, for example, when the conductive connection portion 113 is disposed within the edge of the metal rear cover 12 or the display assembly 10, a slot exists between the projection of the first conductive frame 11 and the conductive connection portion 113 on the X-Y plane. In this case, the thin solid line does not intersect the thick solid line. These all fall within the protection scope of this application.

The ground 13, the first conductive frame 111, the metal rear cover 12, and the conductive connection portion 113 in FIG. 4b jointly enclose the first cavity. In addition, the first slot 104 is provided between the first conductive frame 111 and the metal rear cover 12. For example, the first conductive frame 111 and the metal rear cover 12 are disposed opposite to each other with a particular interval, to form the first slot 104. The first slot 104 is filled with an insulating material, so that the first conductive frame 111 and the metal rear cover 12 are connected.

Similarly, the ground 13, the first conductive frame 111, the display assembly 10, and the conductive connection portion 113 in FIG. 4e jointly enclose the first cavity. The first slot 104 is provided between the first conductive frame 111 and the display assembly. For example, the first conductive frame 111 and the display assembly 10 are disposed opposite to each other at a particular interval, to form the first slot 104. The first slot 104 is filled with an insulating material, so that the first conductive frame 111 and the display assembly 10 are connected.

In some embodiments, the first slot 104 may extend in a length direction of the electronic device, for example, in a Y-axis direction shown in FIG. 4b and FIG. 4e.

In the electronic device according to this embodiment of this application, the ground 13 is stacked with the metal plate (for example, the metal rear cover 12 or the display assembly 10). The ground and the metal plate are connected through the conductive connection portion 113, and a first slot is formed between the metal plate and the conductive frame, so that the ground, the metal plate, the conductive connection portion 113, and the conductive frame jointly form a first cavity having the first slot. In addition to the first slot 104, the first cavity may be a closed cavity, or may be an unclosed cavity. This is described in more detail below. The first slot is provided between the conductive frame and the metal rear cover or the display assembly, so that the first antenna unit can radiate or receive an electromagnetic wave through the first slot. Therefore, no slot is required on a surface of the metal rear cover 12, and integrality of a surface of the electronic device is improved.

It is necessary be noted that, a length of the first slot 104 is not limited in this application, and a length of the slot may be adjusted based on an industrial design (Industrial Design, ID) of the electronic device.

In some embodiments, the first slot 104 is filled with an insulating material. In some other embodiments, a part of the first slot 104 is filled with an insulating material, and another part of the first slot 104 is connected through a metal part. Apart that is of the first slot 104 and that is filled with the insulating material may be used to radiate or receive a signal.

The conductive connection portion is not limited in this embodiment of this application. In some implementations of this application, as shown in FIG. 4b, FIG. 4e, and FIG. 4f, the conductive connection portion 113 uses a conductive wall (Conductive wall) structure.

The conductive wall structure may be a continuous metal sheet, for example, a bent metal sheet, or a discontinuous metal sheet, for example, several metal sheets are combined at an angle. As shown in FIG. 4b, the sheet-like conductive wall structure is disposed between the metal rear cover 12 and the ground 13, one end is connected to the metal rear cover 12, and the other end is connected to the ground 13. Alternatively, as shown in FIG. 4e, the sheet-like conductive wall structure is disposed between the ground 13 and the display assembly 10, one end is connected to the display assembly 10, and the other end is connected to the ground 13.

Figure 4G:
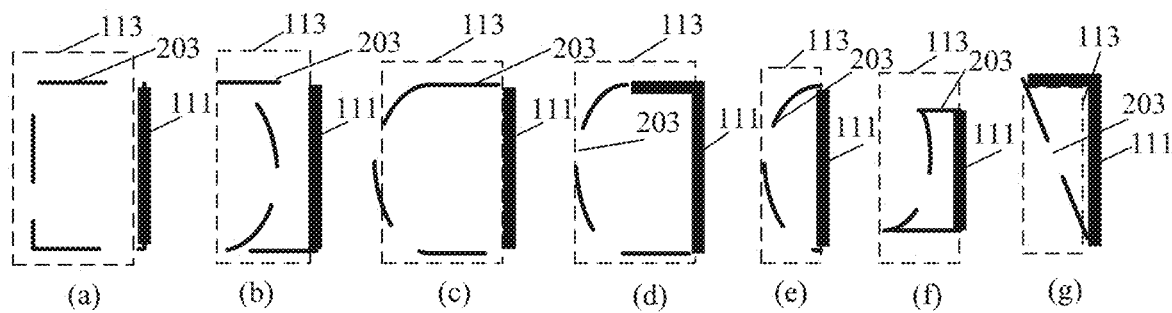
FIG. 4g is a projection diagram of another conductive connection portion according to an embodiment of this application.
Figure 10:
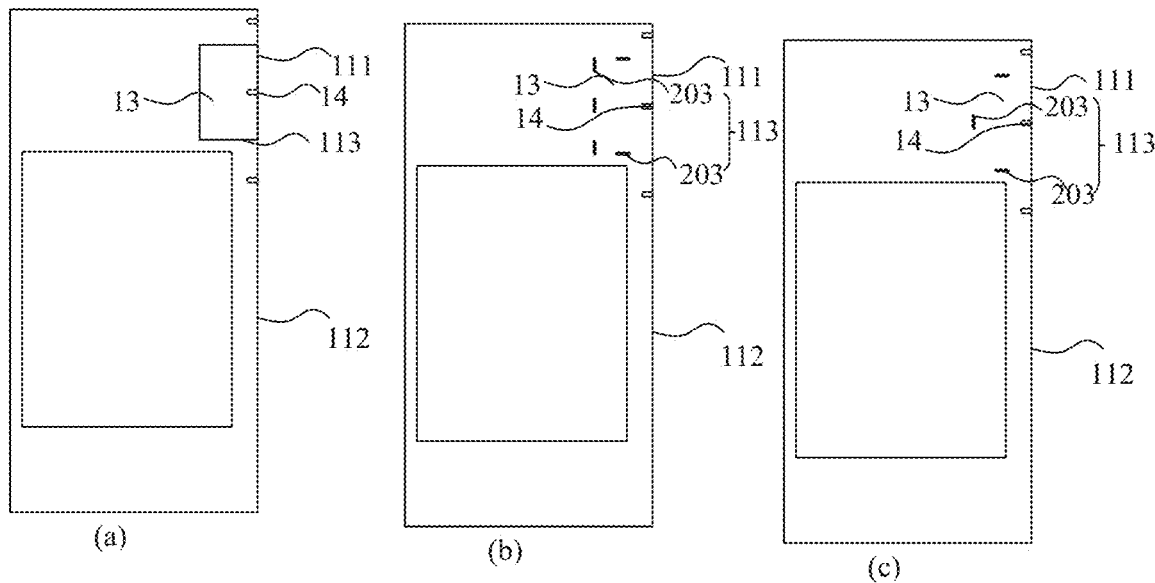
FIG. 10 is a schematic diagram of a structure of another electronic device according to an embodiment of this application.

In some other embodiments of this application, as shown in FIG. 4g and FIG. 10, the conductive connection portion 113 includes a plurality of conductive connection portions 203 or a plurality of dot-joint structures 203. The plurality of connection structures 203 or the plurality of dot-joint structures 203 may be metal sheets or metal domes disposed at different positions, for example, metal sheets disposed separately or metal domes disposed separately.

Each conductive connection portion or each dot-joint structure of the conductive connection portions 203 is configured to connect the ground 13 with the metal plate (not shown). One of plurality of connection structures 203 or one of the plurality of dot-joint structures 203 may be a metal sheet or a metal dome.

In an embodiment provided in FIG. 10 in this application, the ground 13 is stacked with the first conductive layer (for example, metal rear cover 12 or display assembly 10). The ground and the first conductive layer are connected through a plurality of connection structures. A first cavity having a first slot 104 is formed jointly with the conductive frame. In addition to the first slot 104, the first cavity may further be an unclosed cavity. The first slot is provided between the conductive frame and the metal rear cover, so that the first antenna unit may radiate or receive an electromagnetic wave through the first slot. In this way, no slot is required on a surface of the metal rear cover 12, and integrality of a surface of the electronic device is improved.

A shape of the conductive connection portion is not limited in this embodiment of this application. As shown in FIG. 4*f*, the conductive connection portion 113 and the first conductive frame 1 are projected on the ground to form a regular or irregular pattern. A thick solid line part is a projection of the first conductive frame 111. A thin solid line part is a projection of the conductive connection portion 113. It should be understood that the thin solid line part indicating the conductive connection portion 113 and the thick solid line part indicating the first conductive frame 111 may be intersected or be provided with a slot as described above. Details are not described herein again. The thin solid line portion indicating the conductive connection portion 113 may be replaced with a thin dashed line, and as shown in FIG. 4*g*, the conductive connection portion 113 has a plurality of discontinuous connection structures 113.

Refer to (a), (b), (c), (d), (e), (f), and (g) in FIG. 4*f*, the conductive connection portion 113 may be disposed substantially perpendicular to the ground. A projection of the conductive connection portion 113 on the bearing plate may be one or a combination of a curve, a straight line, a fold line. Certainly, in another embodiment, an included angle between the conductive connection portion 113 and the bearing plate may alternatively be greater than or less than 90°, and the projection of the conductive connection portion 113 on the bearing plate may have a specific width.

It is necessary be noted that, Various lines such as curves, straight lines, or fold lines herein represent a projection extension direction of a three-dimensional structure with a particular thickness, and should not be understood that a thickness of the projection is a thickness of a line.

A location relationship between the plurality of connection structures 203 and the plurality of dot-joint structures 203 is not limited in this embodiment of this application. As shown in (a), (b), (c), (d), (e), (f), (g), FIG. 10, and FIG. 24 in FIG. 4*g*, a projection of the plurality of connection structures 203 on the bearing plate may be a dash line, and may enclose a regular or an irregular shape.

A distance between adjacent plurality of connection structures or between adjacent dot-joint structures is less than or equal to a half of a wavelength corresponding to a center frequency of the first antenna 001. The distance between the adjacent plurality of connection structures or the distance between the adjacent dot-joint structures may be the minimum straight-line distance or the minimum path distance between junctions with the first conductive layer or the second conductive layer (for example, ground 13, metal rear cover 12, or display assembly 10) respectively.

Figure 5:
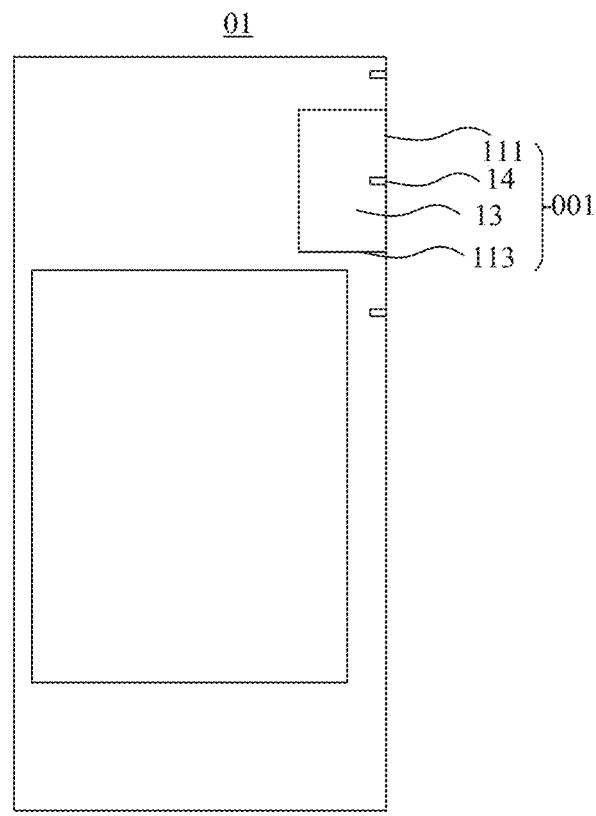
FIG. 5 is a schematic diagram of a structure of an electronic device according to an embodiment of this application.

In some embodiments of this application, as shown in FIG. 5, a first antenna unit 001 jointly formed through the metal rear cover 12, the ground 13, the first conductive frame 111, and the C-shaped conductive connection portion 113 is disposed at a middle position on a right side of the electronic device (rear view). For example, the first conductive frame 111 as the first antenna unit 001 does not include an upper frame and a lower frame, the C-shaped conductive connection portion 113 implements a connection between the metal rear cover 12 and the ground 13, and an insulating first slot exists between a straight strip-shaped conductive frame and the metal rear cover 12.

Figure 16:
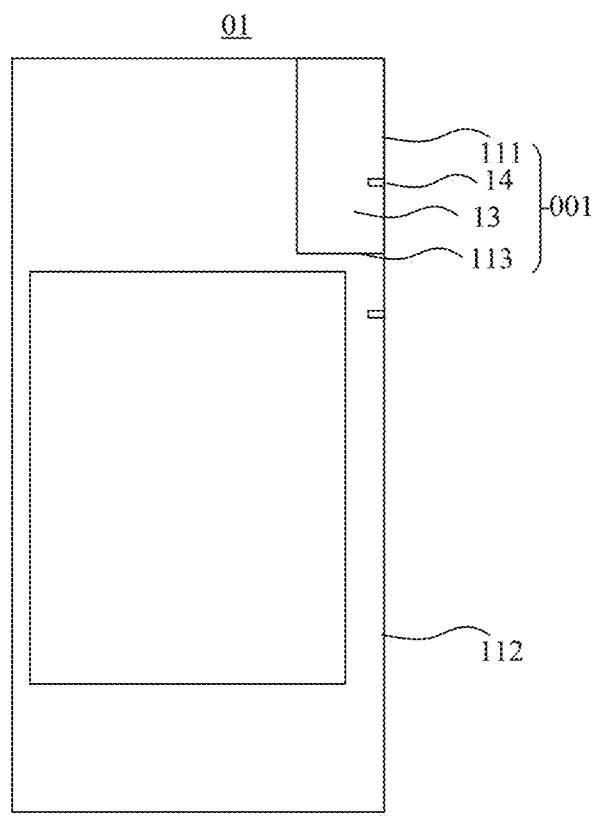
FIG. 16 is a schematic diagram of a structure of another electronic device according to an embodiment of this application.

In some other embodiments of this application, as shown in FIG. 16, a first antenna unit 001 jointly formed through the metal rear cover 12, the ground 13, the first conductive frame 111, and the L-shaped conductive connection portion 113 is disposed in an upper right region of the electronic device (rear view). The L-shaped conductive connection portion 113 implements a connection between the metal rear cover 12 and the ground 13, and a first slot exists between the L-shaped conductive frame in an upper right corner and the metal rear cover 12.

A first slot structure between the first conductive layer (for example, metal rear cover 12 or display assembly 10) and the conductive frame is not limited in this embodiment of this application.

In some embodiments of this application, a height (in a thickness direction of the electronic device) of the metal frame is less than a height difference between the first conductive layer and the ground. The first slot is provided between the first conductive layer and the conductive frame includes:

A first gap between the first conductive layer and the ground on a plane on which the metal frame is located is used as the first slot. For example, the first slot is located in the X-Z plane shown in FIG. 4*a*.

Alternatively, a second gap between the first conductive layer and the conductive frame on a plane on which the ground is located is used as the first slot. For example, the first slot is located in the X-Y plane shown in FIG. 4*a*.

Alternatively, the foregoing first gap and the second gap jointly form the first slot.

To ensure integrality of an industrial design (Industrial Design, ID) of the electronic device, the first slot between the metal plate and the conductive frame is filled with, for example, an insulating material.

A specific material of the insulating material is not limited in this embodiment of this application. In some embodiments of this application, the insulating material is, for example, a polycarbonate and an acrylonitrile-butadiene-styrene copolymer blend, a PC/ABS material.

In some embodiments of this application, setting of a size and related parameters of the first antenna unit is shown as follows.

As shown in FIG. 4*a*, a size of the ground 13 is L1*L2, where L1 is 78 mm, and L2 is 158 mm.

As shown in FIG. 4*b*, FIG. 4*c*, and FIG. 4*d*, a thickness L3 of the metal rear cover 12 is 1 mm, and a gap width between the metal rear cover 12 and the first conductive frame 111 (a gap width between projections of the metal rear cover 12 and the first conductive frame 111 on the X-Y plane) IA is 2 mm, and the slot is filled with an insulating material, for example. A height difference L5 between an inner surface of the metal rear cover 12 and the first conductive frame 111 in a thickness direction of the electronic device 01 is 1.3 mm, a height L6 of the first conductive frame 111 is 2 mm, and a width L7 of the first conductive frame 111 is 1 mm. A projection of the first conductive frame 111 on the X-Y plane is, for example, within a projection range of the display assembly 10 on the X-Y plane. A height difference L8 between a lower edge of the first conductive frame 111 and the display assembly 10 is 2.5 mm, and a thickness L9 of the display assembly 10 is 1 mm.

Example One

The first antenna unit 001 is disposed at a middle position on a right side of the electronic device 01 (rear view), and an upper side, a left side, and a lower side of the first antenna unit 001 are connected to the metal plate (not shown) and the ground 13 through the conductive connection portion 113. On the right side of the electronic device, a first slot is provided between the first conductive frame 111 and the metal plate.

The conductive connection portion 113 uses a conductive wall structure.

As shown in FIG. 5, a feeding point and a ground point of the first antenna unit may be located in the middle of the first antenna unit (for example, the feeding point is located in the middle of the first conductive layer; and the ground point is located in the middle of the second conductive layer) or anywhere else. The first feeding system 14 is connected between the feeding point and the ground point of the first antenna unit. The first feeding system 14 includes, for example, a first feeding unit and a first grounding unit. In some embodiments of this application, the first feeding unit is electrically connected to a feeding point of the first conductive layer (for example, metal rear cover 12 or display assembly 10), and the first grounding unit is electrically connected to a ground point of the second conductive layer (for example, ground 13), and may feed the first conductive layer through the first feeding unit.

The first feeding unit may feed in a coupled manner. In this case, the conductive frame 112 around the electronic device is completely grounded and is not participated in radiation.

Figure 6:
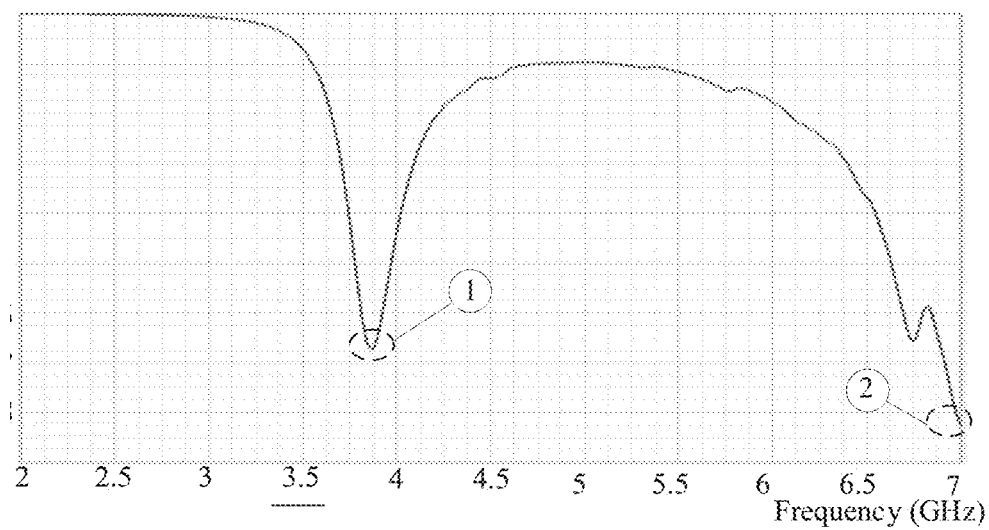
FIG. 6 is a distribution diagram of an S11 parameter of a first antenna unit in FIG. 5.
Figure 7:
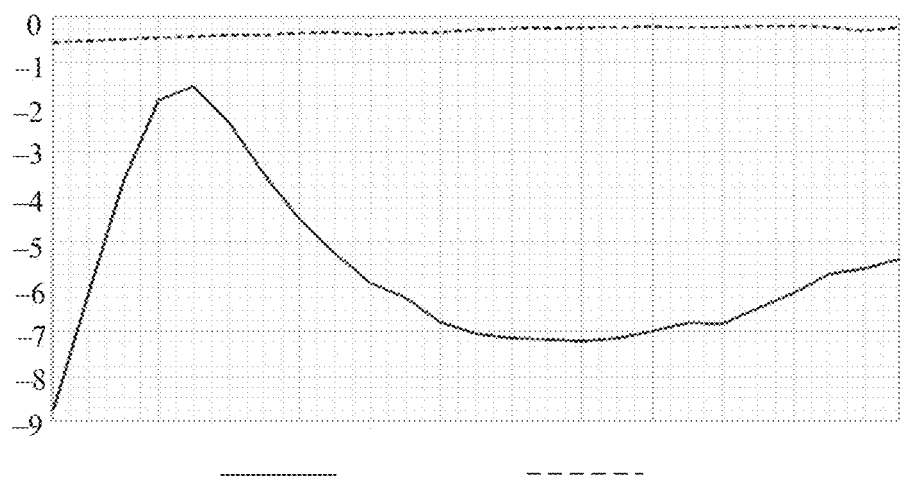
FIG. 7 is a schematic diagram of antenna radiation efficiency of the first antenna unit in FIG. 5.
Figure 8:
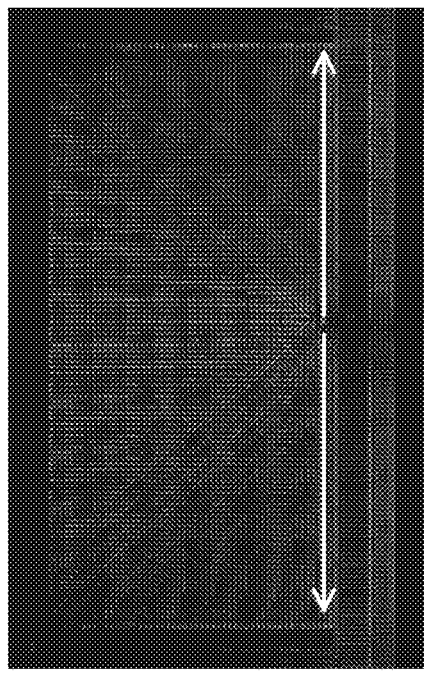
FIG. 8 is a schematic distribution diagram of a current and an electric field of the first antenna unit in FIG. 5.
Figure 8:
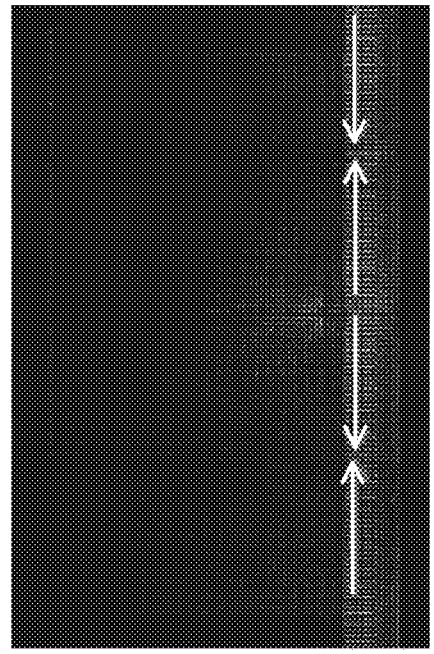
Figure 8:
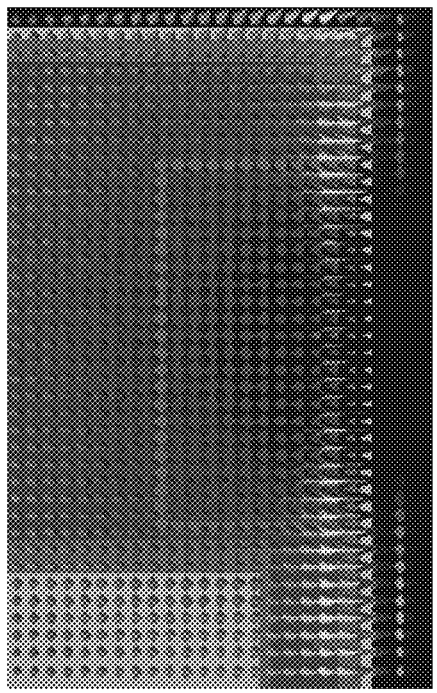
Figure 8:
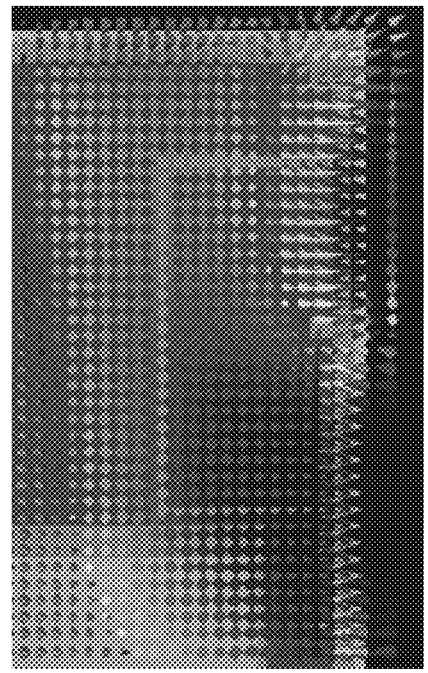
Figure 9:
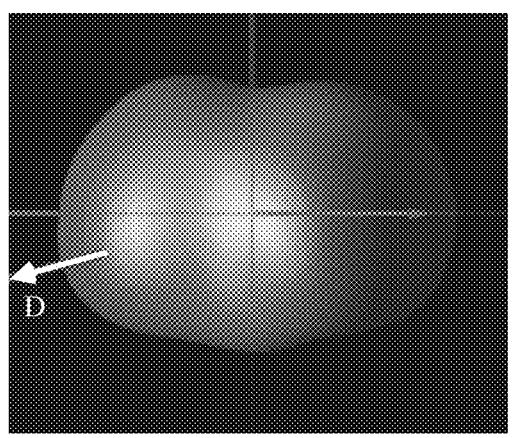
FIG. 9 is a simulation diagram of a radiation direction of the first antenna unit in FIG. 5.
Figure 9:
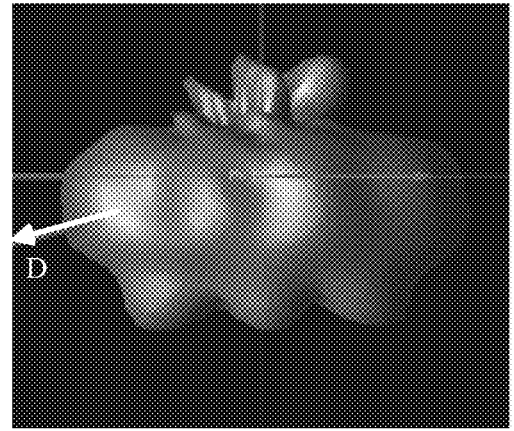

FIG. 6 is a distribution diagram of an S11 parameter of a first antenna unit in FIG. 5. FIG. 7 is a schematic diagram of antenna radiation efficiency of the first antenna unit in FIG. 5. FIG. 8 is a schematic distribution diagram of a current and an electric field of the first antenna unit in FIG. 5. FIG. 9 is a simulation diagram of a radiation direction of the first antenna unit in FIG. 5.

As shown in a curve a in FIG. 6, the first antenna unit resonates at two frequencies ① and ②.

The resonance ① may be generated in a half-wavelength mode of the first antenna unit, and the resonance ② may be generated in a wavelength mode of the first antenna unit.

It is necessary be noted that, the resonance mode being a half-wavelength mode means that the first antenna unit resonates at a half wavelength, and the resonance mode being a wavelength mode means that the first antenna unit resonates at a wavelength.

The distribution diagram of the S11 parameter of the first antenna unit is shown by a curve a in FIG. 6. As shown in the curve a in FIG. 6, when resonance occurs in the first antenna unit, an S11 parameter is relatively small, and an antenna return loss is relatively low. For antenna radiation efficiency of the first antenna unit, refer to a curve 2 in FIG. 7. As shown in the curve 2 in FIG. 7, when resonance occurs in the first antenna unit, radiation efficiency of the antenna is relatively high.

In addition, for antenna system efficiency, refer to a curve 1 in FIG. 7.

(a) in FIG. 8 shows current distribution when resonance ① occurs in the first antenna unit at 3.87 GHz, and (c) in FIG. 8 shows electric field distribution w % ben resonance ① occurs in the first antenna unit at 3.87 GHz.

As shown in (a) and (c) in FIG. 8, a current of the first antenna unit flows from a middle position of the first slot to two ends of the first slot. Currents at two ends of the first slot are the strongest, and an electric field at a middle position of the first slot is the strongest. A signal of the resonance ① may be radiated in a half-wavelength mode of the first antenna unit.

(b) in FIG. 8 shows current distribution when resonance ② occurs in the first antenna unit at 7 GHz, and (d) in FIG. 8 shows electric field distribution when resonance ② occurs in the first antenna unit at 7 GHz.

As shown in (b) and (d) in FIG. 8, two current strength points exist on the first slot of the first antenna unit, and electric field strength points exist at two ends and a middle position of the first slot. A signal of the resonance ② may be radiated in a wavelength mode of the first antenna unit.

Therefore, the resonance ① generated by the first antenna unit at 3.87 GHz is in a half-wavelength mode of the first antenna unit, and the resonance ② generated by the first antenna unit at 7 GHz is in a wavelength mode of the first antenna unit.

Simulation diagrams of radiation directions of the first antenna unit are shown in (a) in FIG. 9 and (b) in FIG. 9. As shown in (a) in FIG. 9 and (b) in FIG. 9, D in FIG. 9 is a directivity factor of a direction indicated by an arrow, where a directivity factor of the direction indicated by the arrow is the largest, and is used as a main radiation direction of the first antenna unit. When resonance occurs in the first antenna unit, the main radiation direction points to the left.

Example Two

In another embodiment of this application, a conductive wall structure cannot be completely implemented, and a plurality of dot-joint structures are usually used for replacement. To ensure excitation of the foregoing first antenna unit mode, a distance between adjacent dot-joint structures cannot exceed a half of a wavelength corresponding to a center frequency of the first antenna 001. The distance between the adjacent dot-joint structures may be the minimum straight-line distance or the minimum path distance between junctions with the first conductive layer or the second conductive layer (for example, ground 13, metal rear cover 12, or display assembly 10) respectively. The conductive connection portion includes a plurality of dot-joint structures. One end of the dot-joint structure is connected to the ground 13, and the other end is connected to the metal rear cover 12. The dot-joint structure is, for example, a metal dome.

As shown in (a) in FIG. 10, the first antenna unit is the same as the first antenna unit in Example one, and a conductive connection portion uses a conductive wall structure. As shown in (b) in FIG. 10, a conductive connection portion uses five dot-joint structures. As shown in (c) in FIG. 10, a conductive connection portion uses three dot-joint structures.

Figure 11:
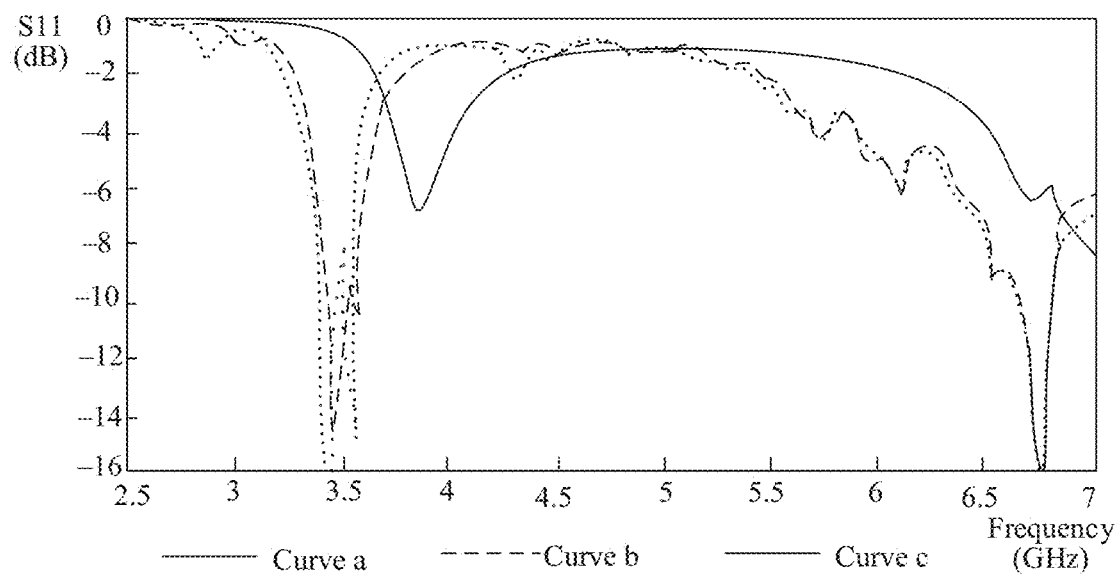
FIG. 11 is a distribution diagram of an S11 parameter of another first antenna unit according to an embodiment of this application.
Figure 12:
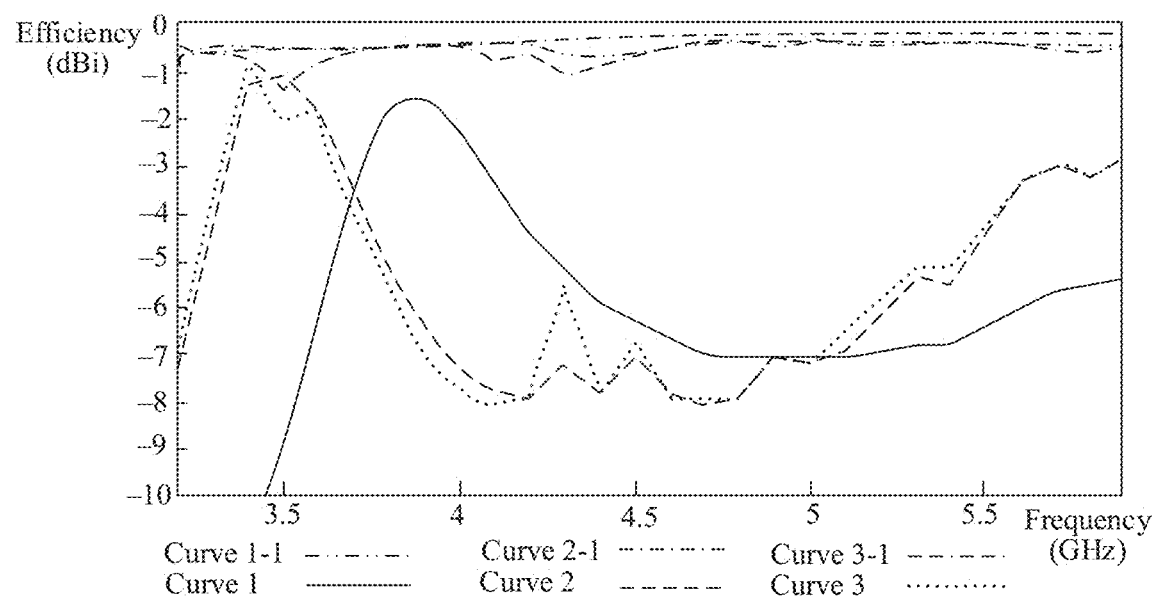
FIG. 12 is a schematic diagram of antenna radiation efficiency of another first antenna unit according to an embodiment of this application.

FIG. 11 and FIG. 12 show performance comparisons when a first antenna unit uses a conductive wall structure, five dot-joint structures, and three dot-joint structures.

FIG. 11 is a distribution diagram of an S11 parameter of another first antenna unit according to an embodiment of this application. FIG. 12 is a schematic diagram of antenna radiation efficiency of another first antenna unit according to an embodiment of this application.

The distribution diagram of the S11 parameter of the first antenna unit shown in (a) in FIG. 10 is shown by the curve a in FIG. 11. The distribution diagram of the S11 parameter of the first antenna unit shown in (b) in FIG. 10 is shown by a curve b in FIG. 11. The distribution diagram of the S11 parameter of the first antenna unit shown in (c) in FIG. 10 is shown by a curve c in FIG. 11.

Compared with the curve a, the curve b, and the curve c in FIG. 11, it can be learned that after the conductive connection portion is changed from a conductive wall to a dot-joint structure, some ripples appear on a curve S11 due to leakage of a cavity, but a resonance frequency is basically unchanged, and an antenna radiation mode is basically maintained. In addition, compared with the conductive wall structure, a resonance frequency of the dot-joint structure is reduced.

Radiation efficiency of the first antenna unit shown in (a) in FIG. 10 is shown by a curve 1-1 in FIG. 11. Radiation efficiency of the first antenna unit shown in (b) in FIG. 10 is shown by a curve 2-1 in FIG. 11. Radiation efficiency of the first antenna unit shown in (c) in FIG. 10 is shown by a curve 3-1 in FIG. 11.

In addition, system efficiency of the first antenna unit shown in (a) in FIG. 10 is shown by a curve 1 in FIG. 11. System efficiency of the first antenna unit shown in (b) in FIG. 10 is shown by a curve 2 in FIG. 11. System efficiency of the first antenna unit shown in (c) in FIG. 10 is shown by a curve 3 in FIG. 11.

Compared with the curve 1, the curve 2, and the curve 3 in FIG. 11, and compared with the curve 1-1, the curve 2-1, and the curve 3-1 in FIG. 11, it can be learned that after point connection is used, due to leakage of a cavity, some ripples appear on the radiation efficiency curve and the system efficiency curve of the first antenna unit, but the antenna radiation mode is basically maintained.

Example Three

When a size of the cavity of the first antenna unit is adjusted, an antenna resonance frequency may be changed.

Figure 13:
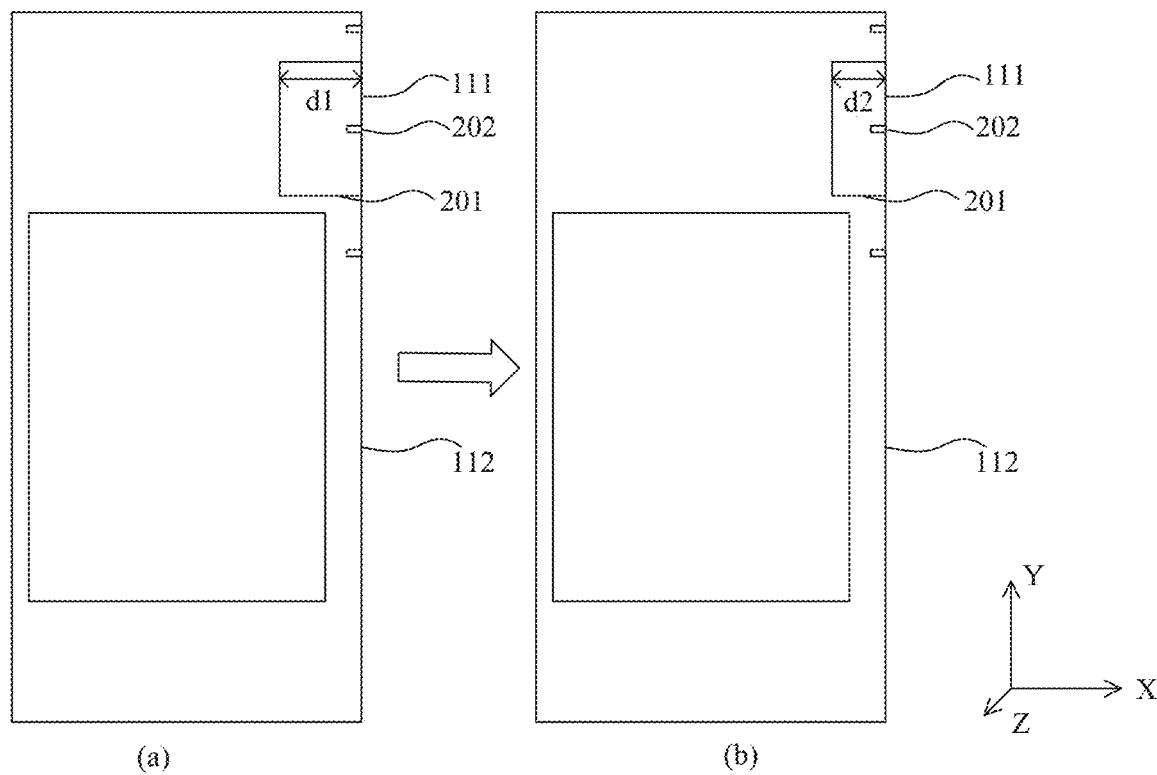
FIG. 13 is a schematic diagram of a structure of another electronic device according to an embodiment of this application.

As shown in (a) in FIG. 13, a size of the first antenna unit in an X direction is d1, and as shown in (b) in FIG. 13, a size of the first antenna unit in the X direction is d2. d1 is, for example, 16 mm, and d2 is, for example, 10 mm.

Figure 14:
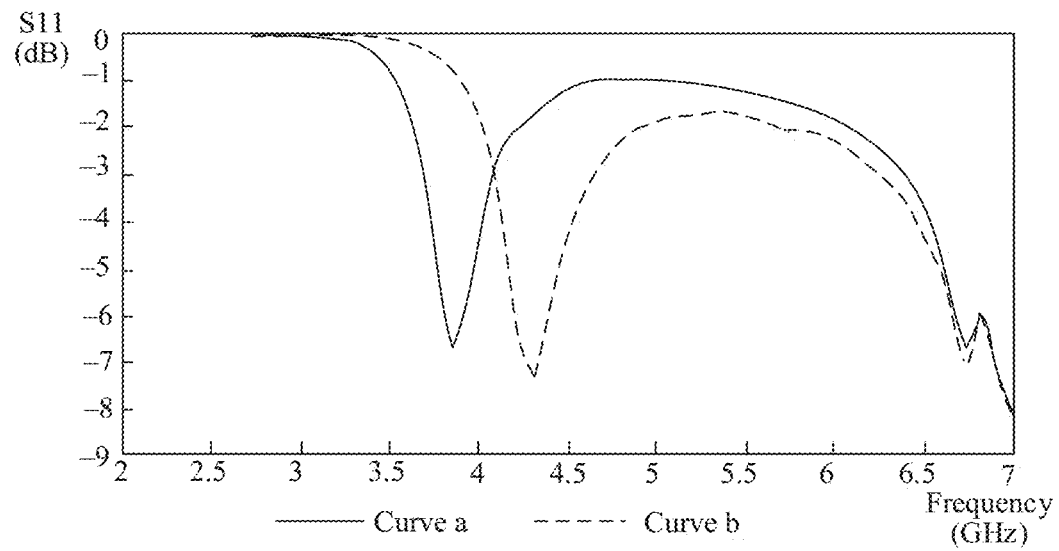
FIG. 14 is a distribution diagram of an S11 parameter of a first antenna unit in FIG. 13.
Figure 15:
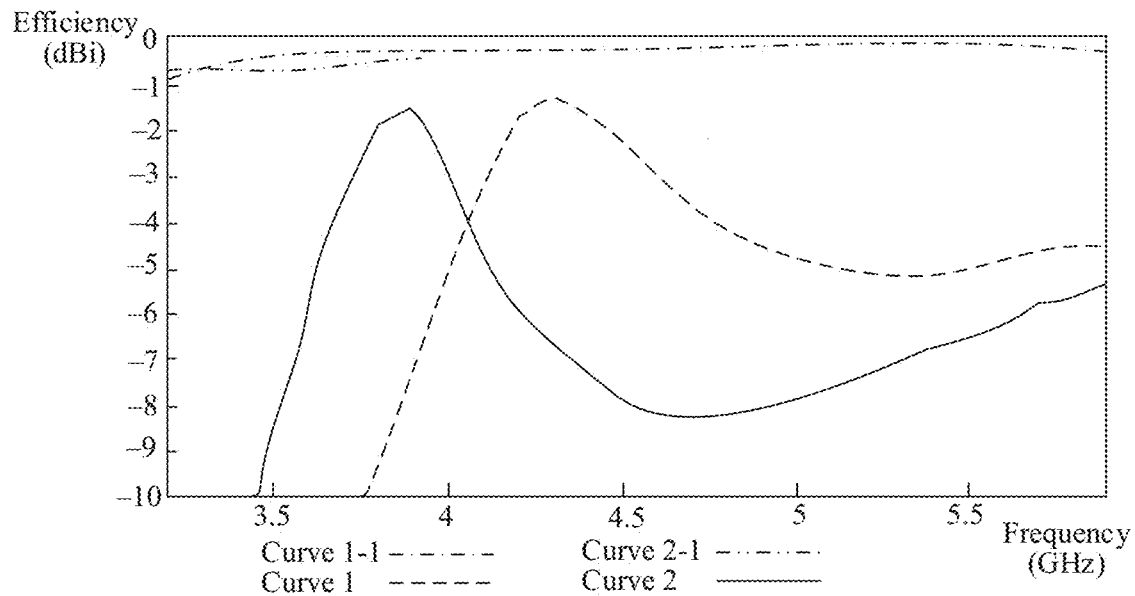
FIG. 15 is a schematic diagram of antenna radiation efficiency of the first antenna unit in FIG. 13.

FIG. 14 and FIG. 15 show performance comparisons when the size of the first antenna unit in the X direction is d1 and d2.

FIG. 14 is a distribution diagram of an S11 parameter of a first antenna unit in FIG. 13. FIG. 15 is a schematic diagram of antenna radiation efficiency of the first antenna unit in FIG. 13.

The distribution diagram of the S11 parameter of the first antenna unit shown in (a) in FIG. 13 is shown by a curve a in FIG. 14. The distribution diagram of the S11 parameter of the first antenna unit shown in (b) in FIG. 13 is shown by a curve b in FIG. 14.

Compared with the curve a and the curve b in FIG. 13, it can be learned that when a width of the conductive wall in the X direction is reduced, a resonance frequency of the first antenna unit is increased.

Radiation efficiency of the first antenna unit shown in (a) in FIG. 13 is shown by a curve 1-1 in FIG. 15. Radiation efficiency of the first antenna unit shown in (b) in FIG. 10 is shown by a curve 2-1 in FIG. 15.

In addition, system efficiency of the first antenna unit shown in (a) in FIG. 13 is shown by a curve 1 in FIG. 15. System efficiency of the first antenna unit shown in (b) in FIG. 13 is shown by a curve 2 in FIG. 15.

Compared with the curve 1 and the curve 2 in FIG. 15, and compared with the curve 1-1 and the curve 2-15 in FIG. 15, it can be learned that when the width of the conductive wall in the X direction is reduced, efficiency of the first antenna unit does not change much.

Example Four

Based on the Example one, three side connections, to be specific, an upper side, a left side, and a lower side connections of a conductive wall structure of a first antenna unit may be changed to two side connections, for example, the left side and the lower side are connected, and both the upper side and the right side are open, as shown in FIG. 16.

Figure 17:
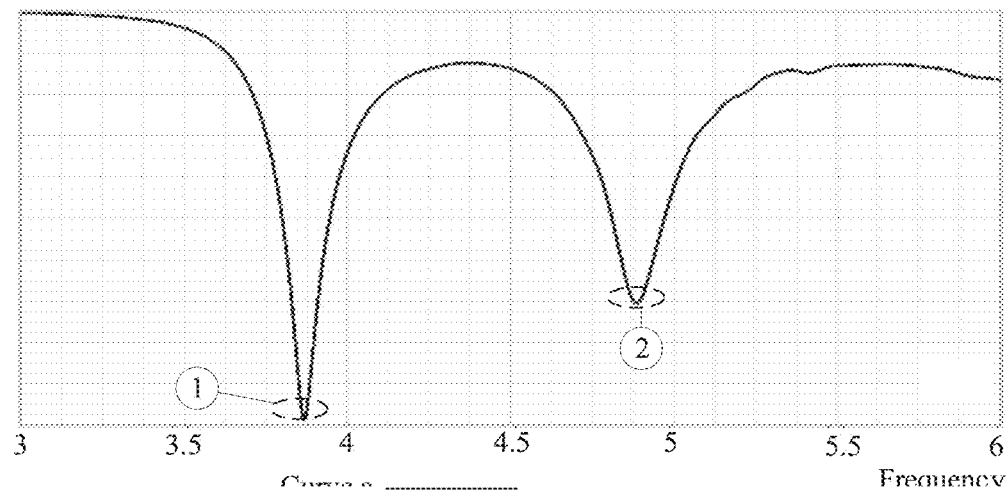
FIG. 17 is a distribution diagram of an S11 parameter of a first antenna unit in FIG. 16.
Figure 18:
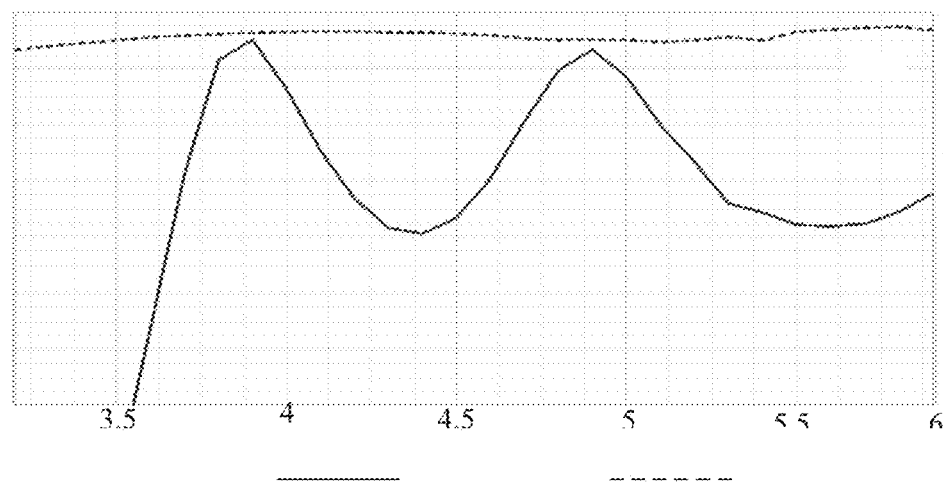
FIG. 18 is a schematic diagram of antenna radiation efficiency of the first antenna unit in FIG. 16.
Figure 19:
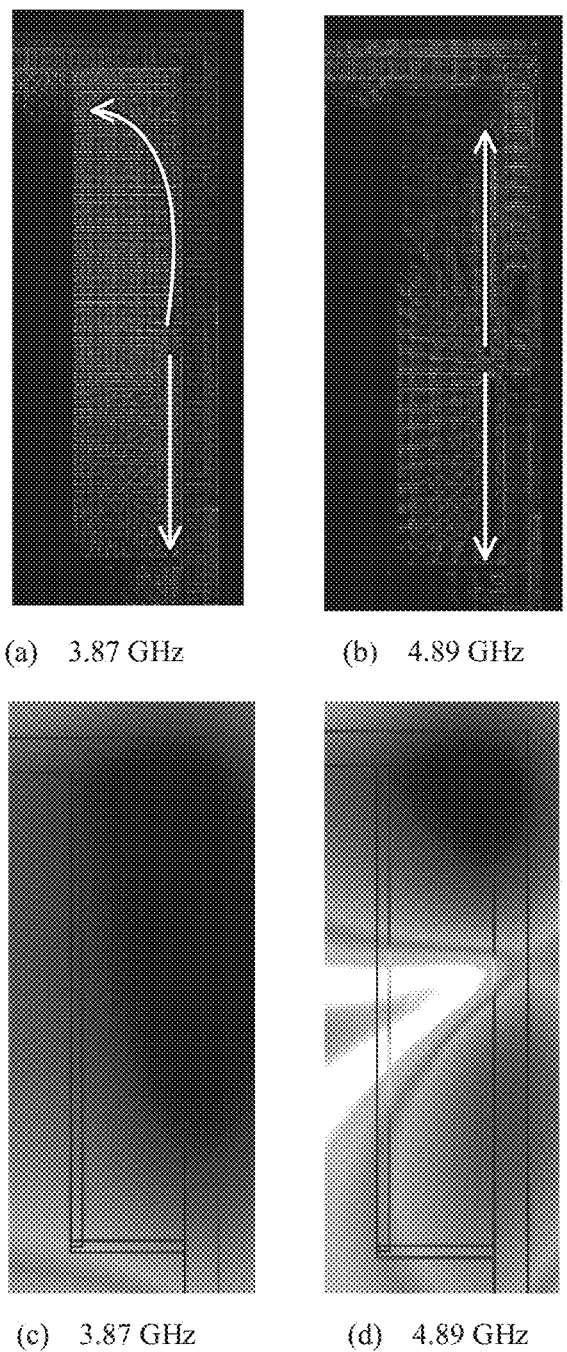
FIG. 19 is a schematic distribution diagram of a current and an electric field of the first antenna unit in FIG. 16.
Figure 20:
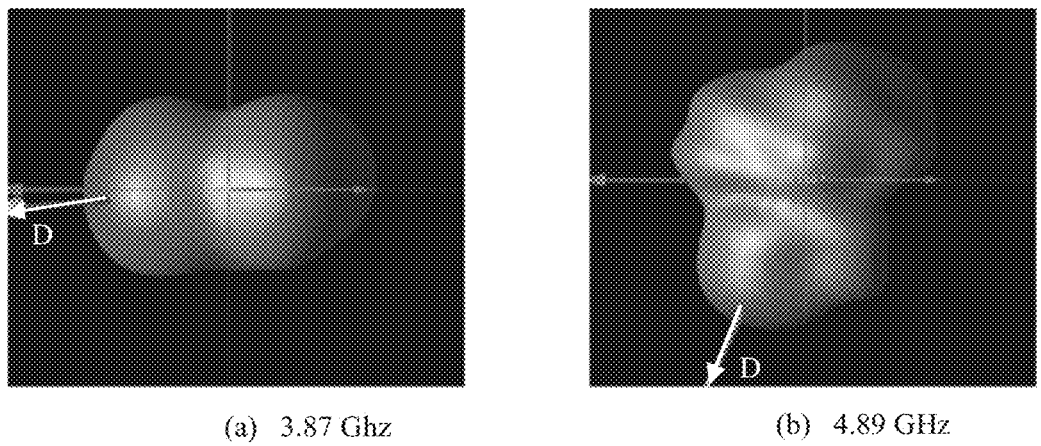
FIG. 20 is a simulation diagram of a radiation direction of the first antenna unit in FIG. 16.

FIG. 17 is a distribution diagram of an S11 parameter of a first antenna unit in FIG. 16. FIG. 18 is a schematic diagram of antenna radiation efficiency of the first antenna unit in FIG. 16. FIG. 19 is a schematic distribution diagram of a current and an electric field of the first antenna unit in FIG. 16. FIG. 20 is a simulation diagram of a radiation direction of the first antenna unit in FIG. 16.

As shown in a curve a in FIG. 17, the first antenna unit resonates at two frequencies ① and ②. Based on the frequency from small to large, resonance modes are a half-wavelength mode and a three-quarters-wavelength mode respectively.

It is necessary be noted that, the resonance mode being a half-wavelength mode means that the first antenna unit resonates at a half of a wavelength, and the resonance mode being a three-quarters-wavelength mode means that the first antenna unit resonates at a three-quarters of a wavelength.

The distribution diagram of the S11 parameter of the first antenna unit is shown by a curve a in FIG. 17. Refer to the curve a in FIG. 17. When resonance occurs in the first antenna unit, the S1 parameter is relatively small, and the antenna return loss is relatively low, and therefore radiation efficiency of the antenna is relatively high.

For antenna radiation efficiency of the first antenna unit, refer to a curve 2 in FIG. 18. As shown in the curve 2 in FIG. 18, when resonance occurs in the first antenna unit, radiation efficiency of the antenna is relatively high.

In addition, for antenna system efficiency, refer to a curve 1 in FIG. 18.

(a) in FIG. 19 shows current distribution when resonance ① occurs in the first antenna unit at 3.87 GHz, and (c) in FIG. 19 shows electric field distribution when resonance ① occurs in the first antenna unit at 3.87 GHz.

As shown in (a) and (c) in FIG. 19, a current of the first antenna unit flows from a middle of the first slot to two ends of the first slot, and an electric field is the strongest at a middle position of the first slot. A signal of the resonance ① may be radiated in a half-wavelength mode of the first antenna unit.

(b) in FIG. 19 shows current distribution when resonance ② occurs in the first antenna unit at 4.89 GHz, and (d) in FIG. 19 shows electric field distribution when resonance ② occurs in the first antenna unit at 4.89 GHz.

As shown in (b) and (d) in FIG. 19, a current of the first antenna unit flows from the middle of the first slot to two ends of the first slot, and an electric field strength point exists at one end of the first slot. A signal of the resonance ② may be radiated in a three-quarters-wavelength mode of the first antenna unit.

Therefore, resonance ① generated by the first antenna unit at 3.87 GHz is in a half-wavelength mode of the first antenna unit, and resonance ② generated by the first antenna unit at 4.89 GHz is in a three-quarters-wavelength mode of the first antenna unit.

(a) in FIG. 20 shows a radiation pattern of the first antenna unit when resonance ① occurs at 3.87 GHz, and (b) in FIG. 20 shows a radiation pattern of the first antenna unit when resonance ② occurs at 4.89 GHz. As shown in FIG. 20, when the first antenna unit is at 3.87 GHz, a main radiation direction is leftward, and when the first antenna unit is at 4.89 GHz, the main radiation direction is downward.

In some other embodiments of this application, the electronic device 01 further includes a second antenna unit 002. The second antenna unit 002 may include a part of a conductive frame 112.

The second antenna unit 002 may transmit or receive signals through the conductive frame 112 that is electrically conductive. Alternatively, a conductive radiator disposed inside the conductive frame 112 that is not electrically conductive or a conductive radiator embedded inside the conductive frame 112 that is not electrically conductive may be used to transmit or receive signals.

In some embodiments, the first antenna unit 001 and the second antenna unit 002 may work in different frequency bands and are used as dual antennas.

In this case, filters may be separately disposed at feeding ends of the first antenna unit 001 and the second antenna unit 002, to filter out signals except an operating frequency band, prevent the first antenna unit 001 and the second antenna unit 002 from having a same frequency, and improve isolation between the first antenna unit 001 and the second antenna unit 002.

In some other embodiments of this application, the first antenna unit 001 and the second antenna unit 002 may work in a same frequency band, the first antenna unit 001 may be coupled to the second antenna unit 002, and the second antenna unit 002 may be used as a parasitic radiator of the first antenna unit. In this case, the first antenna unit 001 and the second antenna unit 002 may be used as one antenna.

In this example, a case in which the first antenna unit 001 and the second antenna unit 002 work in different frequency bands is used as an example for description.

Figure 21:
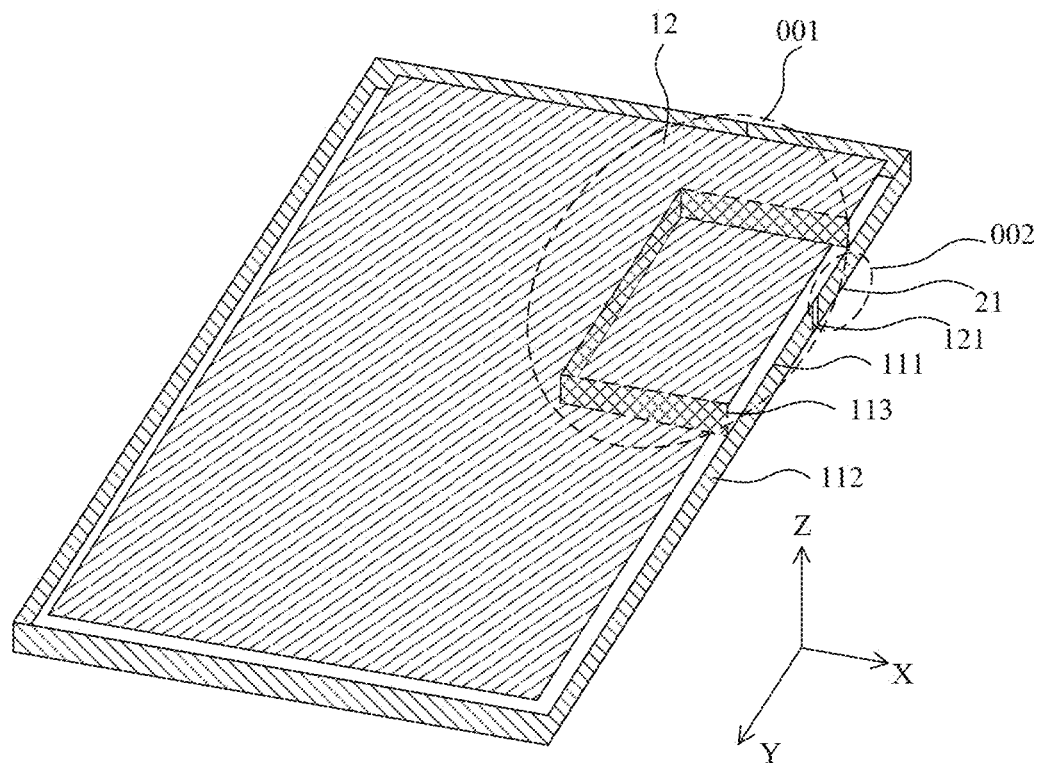
FIG. 21 is a schematic diagram of a structure of another electronic device according to an embodiment of this application.
Figure 21A:
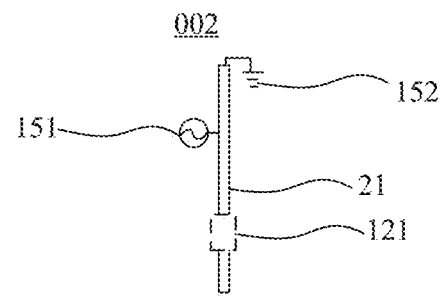
FIG. 21a is a circuit diagram of a second antenna unit in FIG. 21.

In some embodiments of this application, as shown in FIG. 21 and FIG. 21a, the second antenna unit includes a second grounding unit 152, a first radiator 21, and a second feeding unit 151.

The second grounding unit 152 is electrically connected to the conductive frame 112.

A second slot 121 is further provided on the conductive frame 112, a conductive frame between the second grounding unit 152 and the second slot 121 forms the first radiator 21, and the second feeding unit 151 is electrically connected to a feeding end 1511 of the first radiator 21.

Therefore, a plurality of antennas may be disposed on the electronic device, and the first antenna unit and the second antenna unit may work simultaneously, to enhance signal processing reliability, signal transmission range, and throughput, and improve communication quality.

Next, refer to FIG. 21. The first radiator 21 is located at an opening of the conductive connection portion 113. For example, the first radiator 21 is located at a thick solid line shown in FIG. 4c.

In this way, the second antenna unit may be reused for the first antenna unit, and a bandwidth of the first antenna unit may be broadened.

Example Five

Figure 21B:
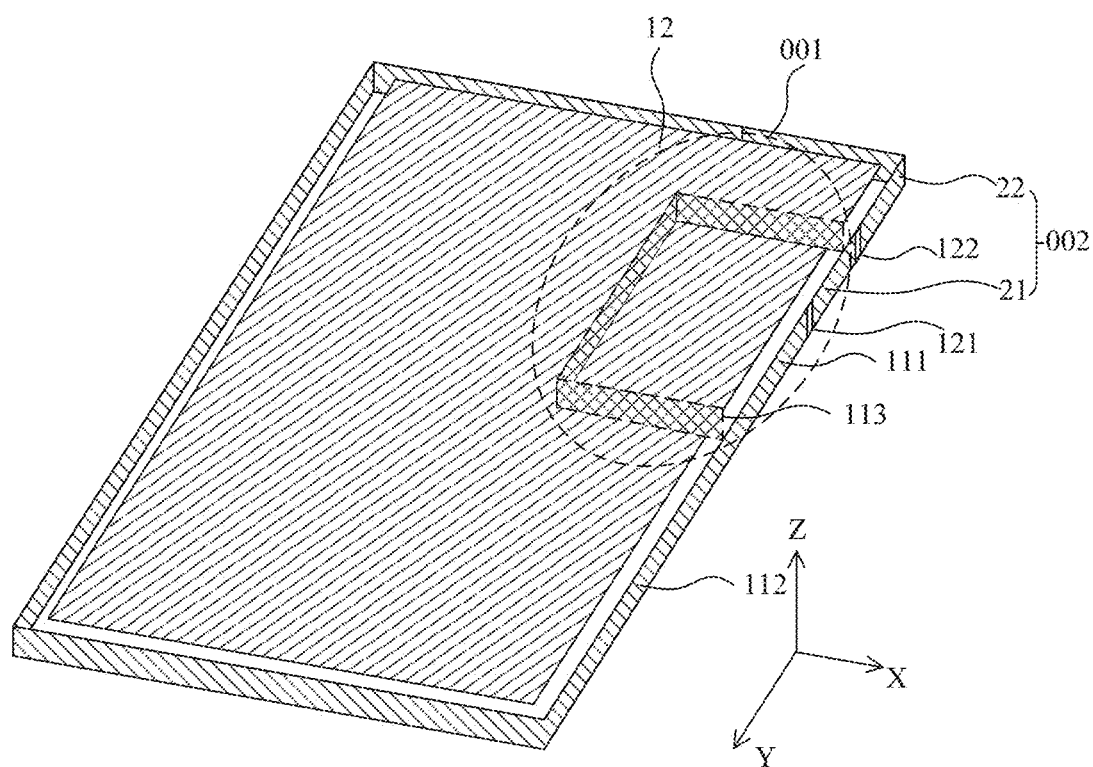
FIG. 21b is a schematic diagram of a structure of another electronic device according to an embodiment of this application.
Figure 21C:
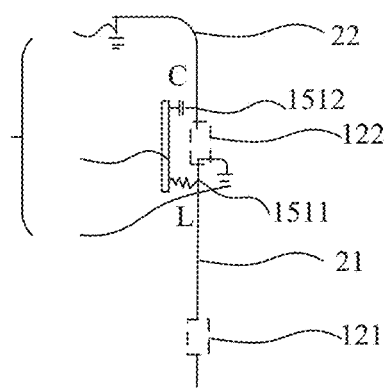
FIG. 21c is a circuit diagram of a second antenna unit in FIG. 21b.
Figure 21D:
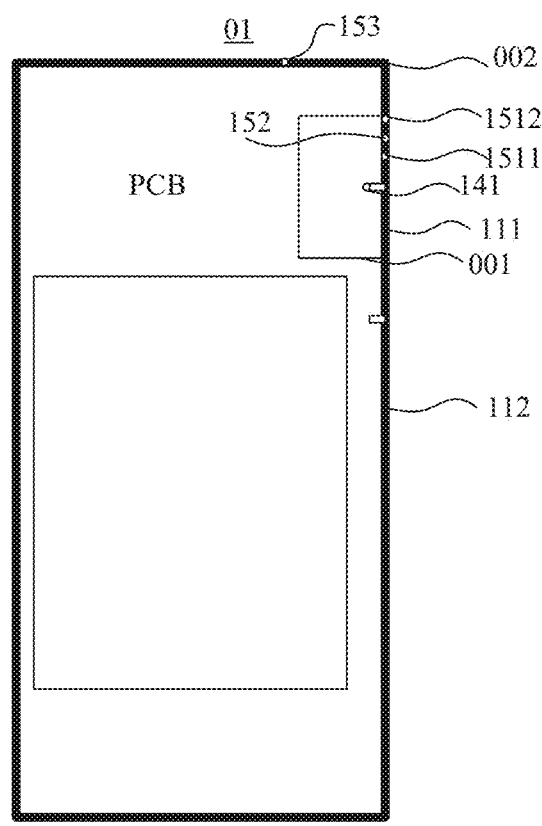
FIG. 21d is a schematic diagram of a structure of another electronic device according to an embodiment of this application.

As shown in FIG. 21b, FIG. 21c, and FIG. 21d, the electronic device 01 includes the first antenna unit 001 shown in Example one and the second antenna unit 002. FIG. 21b is a rear view of an electronic device. The first antenna unit 001 is the first antenna unit in Example one, and a feeding manner and a grounding manner of the first antenna unit 001 are not described again.

As shown in FIG. 21b, FIG. 21c, and FIG. 21d, the second antenna unit 002 includes a first radiator 21 and a second radiator 22, where distributed feeding is used for the first radiator 21 and the second radiator 22. A part of at least one of the first radiator 21 and the second radiator 22 is used as a parasitic radiator of the first antenna unit 001 or is reused as a part of the parasitic radiator of the first antenna unit 001. For example, a part of at least one of the first radiator 21 and the second radiator 22 is located at a thick solid line shown in FIG. 4f or FIG. 4g.

In an embodiment, the second antenna unit 002 is disposed at a first slot on a right side of the first antenna unit 001. The two types of antennas may share a radiator. For example, the first radiator 21 and the second radiator 22 of the second antenna unit 002 may reuse a conductive frame part of the first antenna unit 001.

The electronic device further includes a second feeding system 15. The second feeding system 15 is configured to feed the first radiator 21 and the second radiator 22.

The second feeding system 15 includes, for example, a second feeding unit 151, a second grounding unit 152, and a third grounding unit 153.

Refer to FIG. 21 and FIG. 21a. A second slot 121 is provided on the conductive frame 112, and a conductive frame 112 between the second grounding unit 152 and the second slot 121 forms a first radiator 21.

A third slot 122 is further provided on the conductive frame 112, and a conductive frame 112 between the second slot 121 and the third slot 122 forms a second radiator 22.

The second feeding unit 151 is coupled to a feeding end 1512 of the second radiator 22, and feeds the second radiator 22 in a coupling manner. The third grounding unit 153 is electrically connected to the second radiator 22.

In some other embodiments of this application, the second radiator is coupled to the first radiator. Therefore, the second radiator may be used as a parasitic radiator of the first radiator, so that manufacturing costs of the antenna may be reduced.

At least one of the first radiator 21 and the second radiator 22 is located at a thick solid line shown in FIG. 4f or FIG. 4g. Therefore, the first antenna unit may be coupled to the second antenna unit, and a bandwidth of the first antenna unit may be broadened.

The second antenna unit further includes a first capacitive component C and a first inductive component L. The second feeding unit 151 is electrically connected to the first radiator 21 through the first capacitive component C, and the second feeding unit 151 is electrically connected to the second radiator 22 through the first inductive component L. The first capacitive component C and the first inductive component L are configured to perform impedance matching on the first antenna unit 001.

In addition, the second antenna unit further includes a first filter and a second filter (not shown in the figure). For example, the second feeding unit 151 is electrically connected to the first radiator 21 through the first filter, and is electrically connected to the second radiator 22 through the second filter. The first filter and the second filter are configured to filter out a signal in an operating frequency band of the first antenna unit.

In this way, the first filter and the second filter may filter signals except an operating frequency band, to improve isolation between the first antenna unit 001 and the second antenna unit 002.

The second grounding unit 152 and the third grounding unit 153 of the second feeding system 15 are connected to, for example, a PCB, and the feeding unit 151 is, for example, a transmission line. The transmission line connects the first radiator 21 above the second radiator 22 (which, for example, may be an IFA antenna) to the second radiator 22 (which, for example, may be a CRLH antenna), and is a distributed feeding structure.

Figure 22:
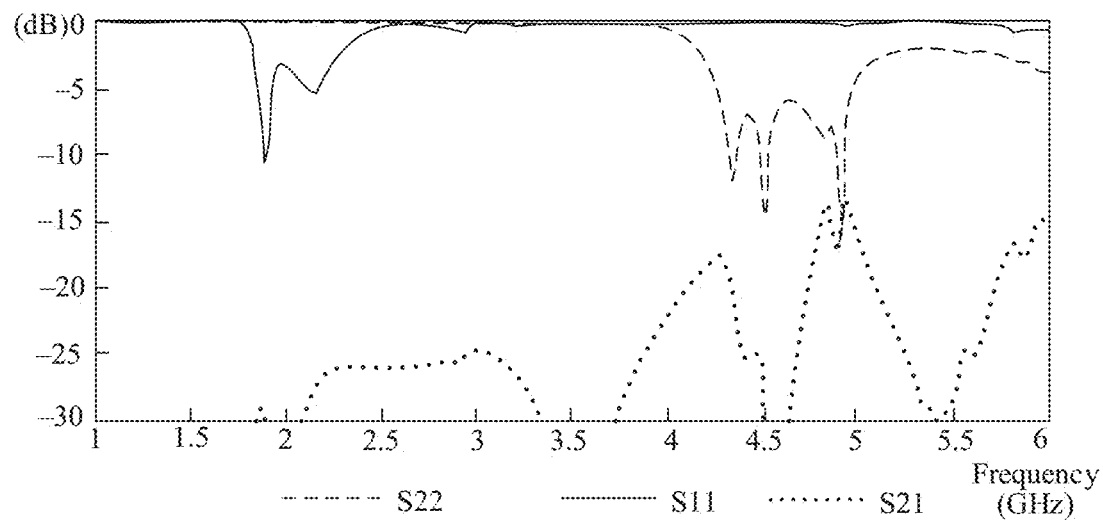
FIG. 22 is a distribution diagram of S11, S22, and S12 parameters of an antenna unit in FIG. 21d.
Figure 23:
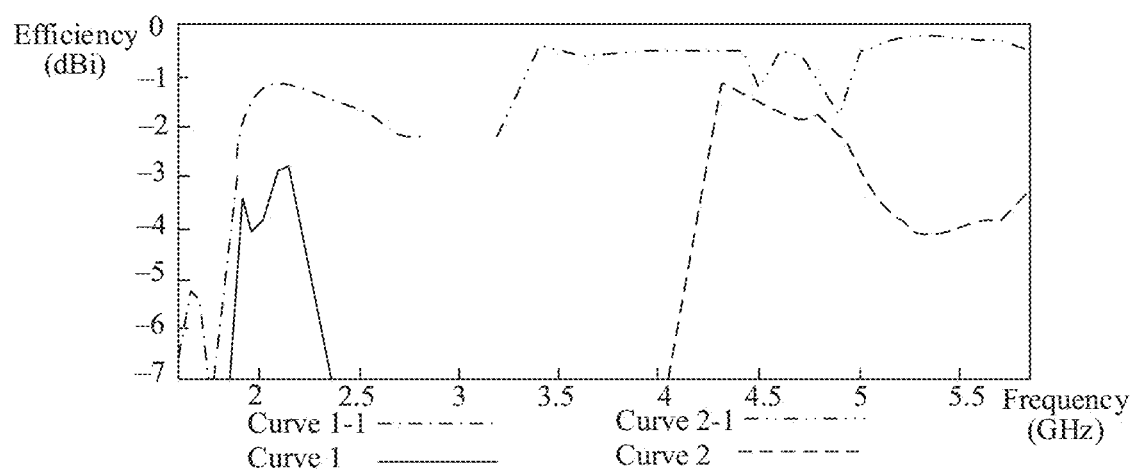
FIG. 23 is a schematic diagram of radiation efficiency of the antenna unit in FIG. 21d.

FIG. 22 is a distribution diagram of S11, S22, and S12 parameters of an antenna unit in FIG. 21*d*. FIG. 23 is a schematic diagram of radiation efficiency of the antenna unit in FIG. 21*d*.

A reflection coefficient of the second antenna unit in FIG. 21*d* is shown by a curve S11 in FIG. 22. A reflection coefficient of the first antenna unit in FIG. 21*d* is shown by a curve S22 in FIG. 22. Isolation between the first antenna unit and the second antenna unit in FIG. 21*d* is shown by a curve S21 in FIG. 22.

Radiation efficiency of the second antenna unit in FIG. 21*d* is shown by a curve 1-1 in FIG. 23. Radiation efficiency of the first antenna unit in FIG. 21*d* is shown by a curve 2-1 in FIG. 23.

In addition, system efficiency of the second antenna unit in FIG. 21*d* is shown by a curve 1 in FIG. 23. System efficiency of the first antenna unit in FIG. 21 is shown by a curve 2 in FIG. 23.

Resonance of the first antenna unit occurs at B3 frequency band (uplink 1710-1785 MHz, downlink 1805-1880 MHz), and resonance of the second antenna unit occurs at N79 frequency band.

Example Six

Figure 24:
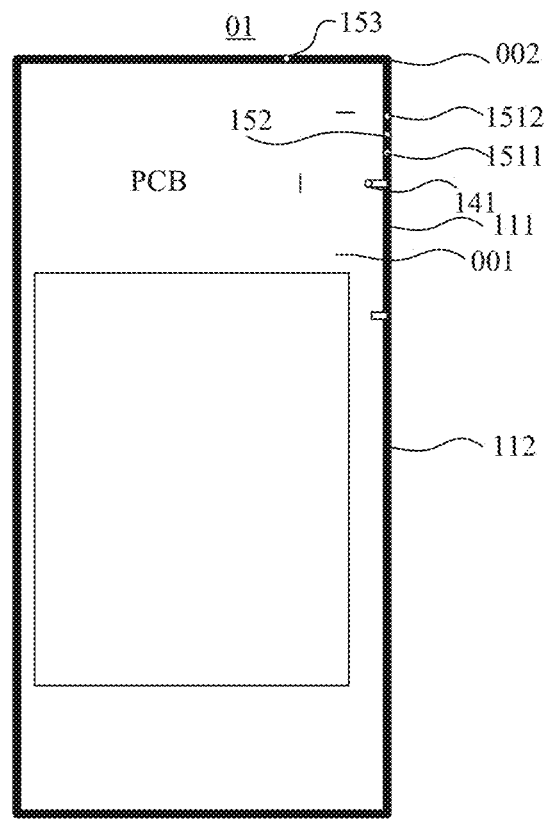
FIG. 24 is a schematic diagram of a structure of another electronic device according to an embodiment of this application.

As shown in FIG. 24, compared with Example four, the conductive wall, which is the conductive connection portion, of the first antenna unit is replaced by a plurality of dot-joint structures, and other structures remain unchanged.

Figure 25:
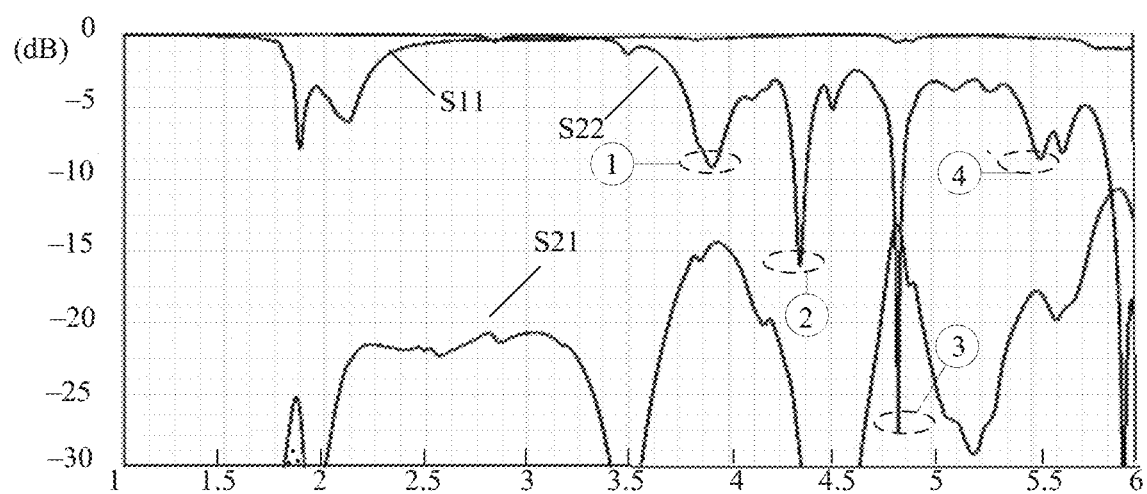
FIG. 25 is a distribution diagram of S11, S22, and S12 parameters of an antenna unit in FIG. 24.
Figure 26:
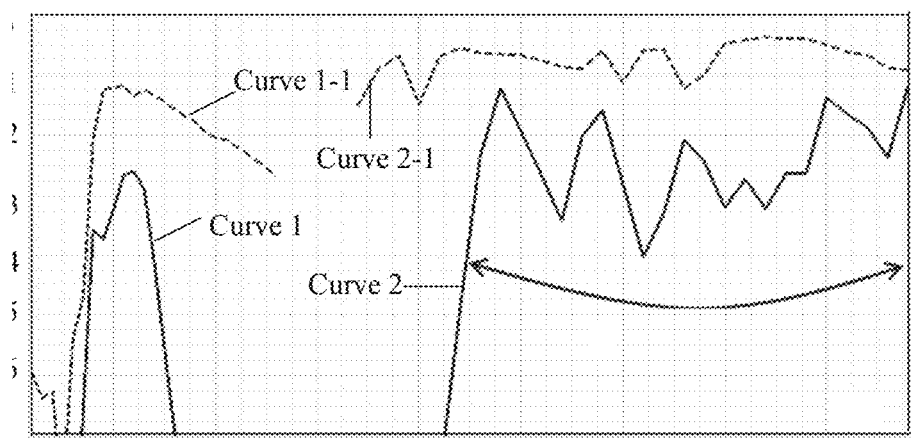
FIG. 26 is a schematic diagram of antenna radiation efficiency of the antenna unit in FIG. 24.
Figure 27:
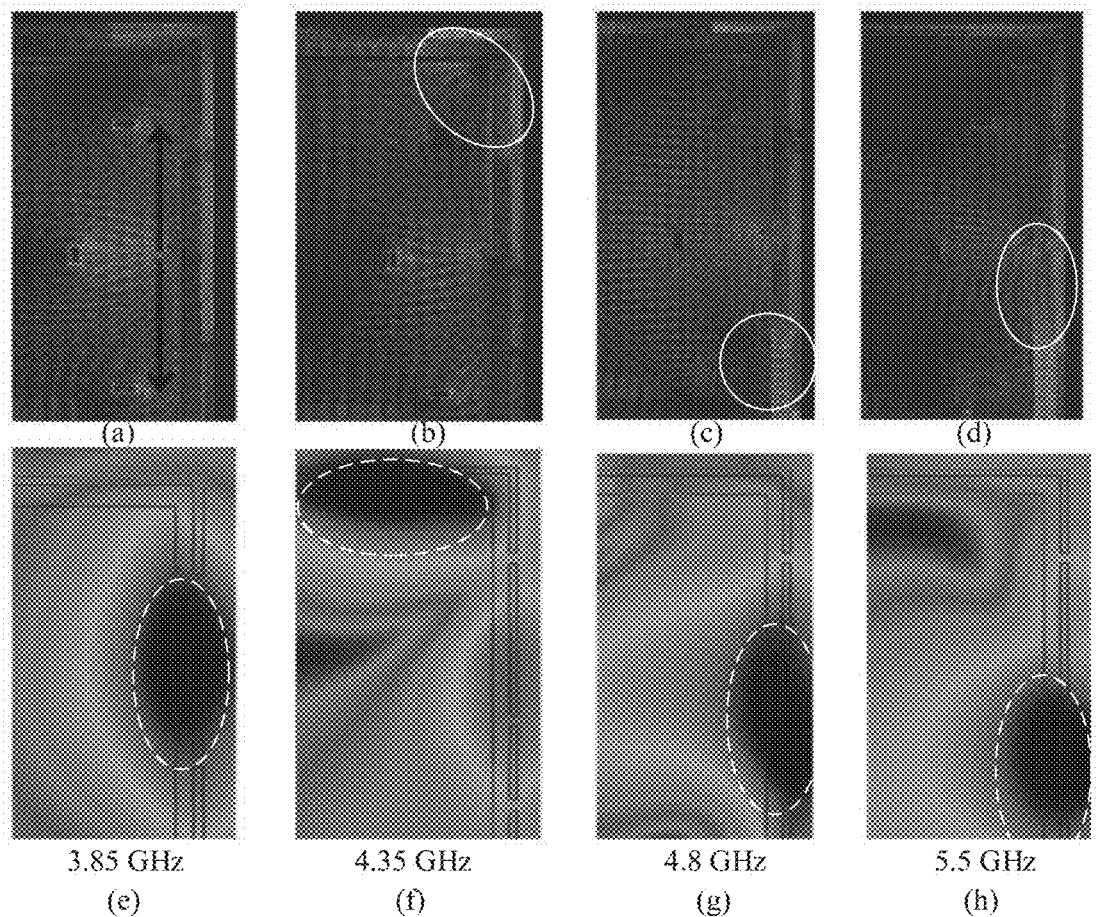
FIG. 27 is a schematic distribution diagram of a current and an electric field of the antenna unit in FIG. 24.
Figure 28:
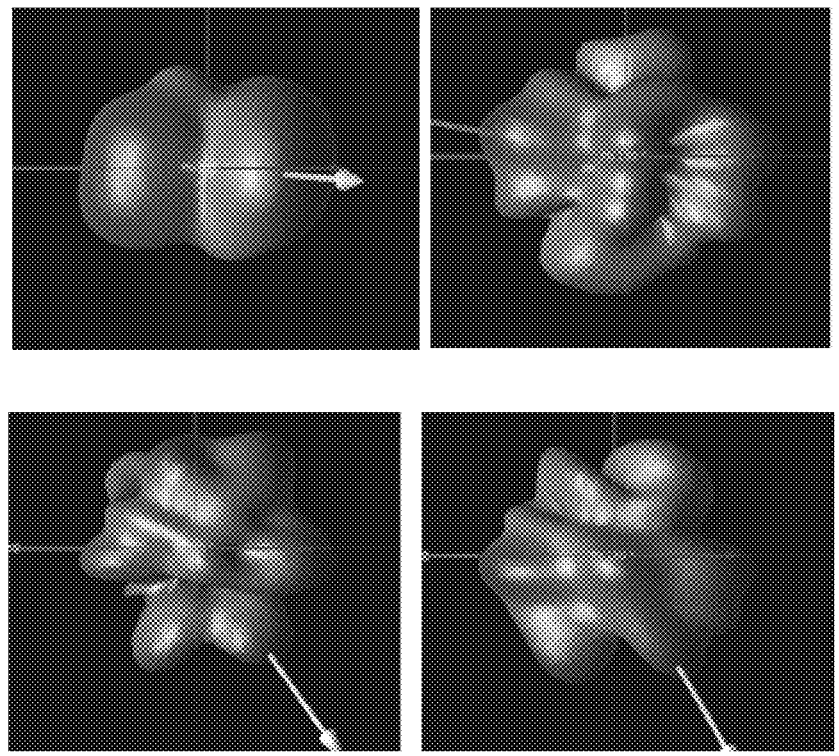
FIG. 28 is a simulation diagram of a radiation direction of the antenna unit in FIG. 24.

FIG. 25 is a distribution diagram of S11, S22, and S12 parameters of an antenna unit in FIG. 24. FIG. 26 is a schematic diagram of antenna radiation efficiency of the antenna unit in FIG. 24. FIG. 27 is a schematic distribution diagram of a current and an electric field of the antenna unit in FIG. 24. FIG. 28 is a simulation diagram of a radiation direction of the antenna unit in FIG. 24;

A reflection coefficient of the second antenna unit in FIG. 24 is shown by an S11 curve in FIG. 25. A reflection coefficient of the first antenna unit in FIG. 24 is shown by an S22 curve in FIG. 25. Isolation between the first antenna unit and the second antenna unit in FIG. 24 is shown by an S21 curve in FIG. 25.

Radiation efficiency of the second antenna unit in FIG. 24 is shown by a curve 1-1 in FIG. 26. Radiation efficiency of the first antenna unit in FIG. 24 is shown by a curve 2-1 in FIG. 26.

In addition, system efficiency of the second antenna unit in FIG. 24 is shown by a curve 1 in FIG. 26. System efficiency of the first antenna unit m FIG. 24 is shown by a curve 2 in FIG. 26.

As shown in FIG. 25, resonance occurs in the first antenna unit in all bandwidths corresponding to four frequencies ①, ②, ③, and ④. A resonance frequency of resonance ① is 3.85 GHz, a resonance frequency of resonance ② is 4.35 GHz, a resonance frequency of resonance ③ is 4.8 GHz, and a resonance frequency of resonance ④ is 5.5 GHz. Compared with Example one and Example two, a plurality of modes are added to the first antenna unit 001 in a high frequency band, and bandwidth coverage is increased.

FIG. 27 shows distribution of a current and an electric field at four resonant frequencies ①, ②, ③, and ④. Positions circled in (b), (c), and (d) in FIG. 27 are current strength points, and positions circled in (e), (f), (g), and (h) in FIG. 27 are electric field strength points.

(a) in FIG. 27 shows current distribution when a resonance ① occurs at 3.85 GHz, and (e) in FIG. 27 shows electric field distribution when the resonance ① occurs at 3.85 GHz.

As shown in (a) and (e) in FIG. 27, a current of the first antenna unit flows from a middle of the first slot to two ends of the first slot, and an electric field at a middle position of the first slot is the strongest.

(b) in FIG. 27 shows current distribution when a resonance ② occurs at 4.35 GHz, and (f) in FIG. 27 shows electric field distribution when the resonance ② occurs at 4.35 GHz.

As shown in (b) and (f) in FIG. 27, an electric field strength point is on the second antenna unit 002.

(c) in FIG. 27 shows current distribution when a resonance ③ occurs at 4.8 GHz, and (g) in FIG. 27 shows electric field distribution when the resonance ② occurs at 4.8 GHz.

As shown in (c) and (g) in FIG. 27, electric field strength points exist at both the first antenna unit and the second antenna unit.

(d) in FIG. 27 shows current distribution when a resonance ④ occurs at 5.5 GHz, and (h) in FIG. 27 shows electric field distribution when the resonance ④ occurs at 5.5 GHz.

As shown in (d) and (h) in FIG. 27, electric field strength points exist at both the first antenna unit and the second antenna unit.

As shown in (a) and (e) in FIG. 27 and (a) in FIG. 28, it can be seen from the current distribution and the electric field distribution of the resonance ① that an electric field strength point is at the first slot of the first antenna unit, and low resonance is mainly radiated by the first antenna unit.

As shown in (b) and (f), (c) and (g), (d) and (h) in FIG. 27, and (b), (c), and (d) in FIG. 28, it can be seen from the current distribution and the electric field distribution of the resonances ②, ③, and ④ that an electric field strength point also exists at the second antenna unit. This indicates that several relatively high resonances are coupled to a frame radiator, and the second antenna unit is participated in radiation. In addition, a pattern changes greatly compared with (a) in FIG. 28. Because the first antenna unit and the second antenna unit do not have a same frequency, the second antenna unit can be reused in designs of two antennas.

It is necessary be noted that, the antenna unit according to this embodiment of this application is not limited to a combination of the second antenna unit 002 disposed on the frame 11 and the first antenna unit 001 disposed on the metal plate. Alternatively, the first antenna unit 001 may be disposed at a position of the center frame, and formed on a support grounding structure through a laser direct structuring (Laser Direct structuring, LDS) technology. Therefore, the antenna unit according to this application may alternatively be a combination of a support antenna and the first antenna unit 001 disposed on the metal plate, or may be a combination of a support antenna and the second antenna unit 002 disposed on the frame 11.

Figure 29:
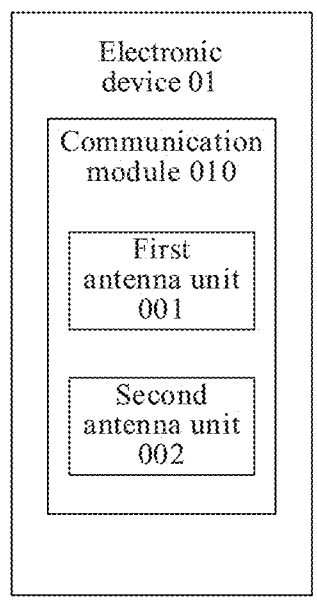
FIG. 29 is a block diagram of an electronic device according to an embodiment of this application.

As shown in FIG. 29, the electronic device 01 may further include a communication module 010.

For example, the communication module 010 includes the first antenna unit 001, the second antenna unit 002, a mobile communication module, a wireless communication module, a modem processor, a baseband processor, and the like in the foregoing embodiment.

The first antenna unit 001 and the second antenna unit 002 may be configured to transmit and receive an electromagnetic wave signal. Each antenna in a smart appliance may be configured to cover one or more communication frequency bands.

The mobile communication module may provide wireless communication solutions applied to intelligent electrical appliances, including a 2nd generation mobile communications technology (2nd generation mobile communications technology), a 3rd generation mobile communications technology (3rd generation mobile communications technology), and a 4th generation mobile communications technology (4th generation mobile communications technology) and a 5th generation mobile communications technology (5th generation mobile communications technology). The mobile communication module may include at least one filter, a switch, a power amplifier, a low noise amplifier (low noise amplifier, LNA), and the like. The mobile communication module may receive an electromagnetic wave through an antenna, perform processing such as filtering or amplification on the received electromagnetic wave, and transmit a processed electromagnetic wave to the modem processor for demodulation. The mobile communication module may further amplify a signal modulated by the modem processor, convert an amplified signal into an electromagnetic wave through the antenna, and radiate the electromagnetic wave. In some embodiments, at least some function modules of the mobile communication module may be disposed in a processor 001. In some embodiments, at least some function modules of the mobile communication module may be disposed in a same device as at least some modules of the processor 001.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits a demodulated low-frequency baseband signal to the baseband processor for processing. The low-frequency baseband signal is processed by the baseband processor and then transmitted to an application processor. The application processor outputs a sound signal through an audio device (not limited to a speaker, a microphone, or the like), or displays an image or a video through a display 009. In some embodiments, the modem processor may be an independent device. In some other embodiments, the modem processor may be independent of the processor 001, and is disposed in a same device as the mobile communication module or another functional module.

The wireless communication module may provide wireless communication solutions applied to intelligent electrical appliances, including a wireless local area network (wireless local area network, WLAN) (like a wireless fidelity (wireless fidelity, Wi-Fi) network), a Bluetooth (Bluetooth, BT), and a global navigation satellite system (global navigation satellite system. GNSS), frequency modulation (frequency modulation, FM), a near field communication (near field communication, NFC) technology, an infrared (infrared, IR) technology, and the like. The wireless communication module may integrate at least one communication processing module 014. The wireless communication module receives an electromagnetic wave through the antenna, performs frequency modulation and filtering processing on an electromagnetic wave signal, and sends a processed signal to the processor 001. The wireless communication module may further receive a to-be-sent signal from the processor 001, perform frequency modulation and amplification on the signal, convert a processed signal into an electromagnetic wave through the antenna, and radiate the electromagnetic wave.

In some embodiments, one antenna of a smart appliance is coupled to a mobile communication module, and another antenna is coupled to a wireless communication module, so that the smart appliance may communicate with a network and another device through a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution. LTE), BT, a GNSS, a WLAN, NFC, FM, an IR technology, and the like. The GNSS may include a Global Positioning System (Global Positioning System, GPS), a Global Navigation Satellite System (Global Navigation Satellite System, GLONASS), a BeiDou Navigation Satellite System (Beidou Navigation Satellite System. BDS), a Quasi-Zenith Satellite System (Quasi-Zenith Satellite System. QZSS), and/or a Satellite Based Augmentation System (Satellite Based Augmentation System, SBAS).

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:
1. An electronic device, comprising:
a conductive frame comprising a first conductive frame and disposed around a periphery of the electronic device;
a first antenna structure comprising:
 a first conductive layer and a second conductive layer spaced apart in a thickness direction of the electronic device; and
 a conductive connection portion configured to connect the first conductive layer and the second conductive layer, wherein the conductive connection portion comprises a plurality of dot-joint structures, and wherein a distance between adjacent dot-joint structures is less than or equal to a half of a wavelength corresponding to a center frequency of an operating frequency band of the first antenna structure; and
a first cavity comprising a first slot,
wherein the first cavity is formed by the conductive connection portion, the first conductive frame, the first conductive layer, and the second conductive layer, and
wherein the first conductive layer and the first conductive frame are spaced apart to form the first slot of the first cavity.

2. The electronic device of claim 1, further comprising a first feeding structure configured to feed the first antenna structure through the first conductive layer, wherein the first feeding structure is coupled to the first conductive layer.

3. The electronic device of claim 1, further comprising a ground, wherein the second conductive layer is coupled to the ground, and wherein the first antenna structure is grounded through the second conductive layer.

4. The electronic device of claim 1, further comprising a ground, wherein the ground forms the second conductive layer.

5. The electronic device of claim 4, further comprising a metal rear cover configured to form the first conductive layer.

6. The electronic device of claim 5, wherein the metal rear cover does not comprise a slot configured to radiate or receive an electromagnetic wave.

7. The electronic device of claim 4, further comprising a display assembly, wherein the first conductive layer is disposed on a side that is of the display assembly and that faces the ground.

8. The electronic device of claim 1, wherein the conductive connection portion is structured by a conductive wall structure, and wherein two sides of the conductive wall structure are connected to the first conductive layer and the second conductive layer respectively.

9. The electronic device of claim 1, wherein the dot-joint structures are metal domes, and wherein two ends of the metal domes are connected to the first conductive layer and the second conductive layer respectively.

10. The electronic device of claim 1, wherein a projection of the conductive connection portion on the second conductive layer is within a range of a projection of the first conductive layer on the second conductive layer.

11. The electronic device of claim 10, wherein the projection of the conductive connection portion on the second conductive layer is one or a combination of a curve, a fold line, or a straight line.

12. The electronic device of claim 1, wherein the first slot is filled with an insulating material.

13. The electronic device of claim 1, wherein the first antenna structure radiates or receives an electromagnetic wave through the first slot.

14. The electronic device of claim 1, wherein the conductive frame comprises a second slot, and wherein the electronic device further comprises:
    a second antenna structure comprising:
        a first ground point disposed on the conductive frame and configured to ground the second antenna structure; and
        a first radiator formed by a portion of the conductive frame between the first ground point and the second slot; and
    a second feeding structure configured to feed the second antenna structure.

15. The electronic device of claim 14, wherein at least a portion of the first radiator is formed by the first conductive frame.

16. The electronic device of claim 14, further comprising a first filter coupled to the second feed structure to the first radiator.

17. The electronic device of claim 14, wherein the second antenna structure further comprises:
    a second radiator formed by a portion of the conductive frame between the second slot and the first slot; and
    a second ground point disposed on the second radiator and configured to ground the second antenna structure.

18. The electronic device of claim 17, wherein the first radiator is coupled to the second radiator through the second slot.

19. The electronic device of claim 17, further comprising a second filter coupled to the second feeding structure to the second radiator.

20. The electronic device of claim 1, wherein the distance between the adjacent dot-joint structures is a minimum straight-line distance or a minimum path distance between junctions with the first conductive layer or the second conductive layer.

* * * * *